United States Patent
Kanunikov et al.

(10) Patent No.: US 11,491,654 B2
(45) Date of Patent: Nov. 8, 2022

(54) ROBOTIC SYSTEM WITH DYNAMIC PACK ADJUSTMENT MECHANISM AND METHODS OF OPERATING SAME

(71) Applicant: MUJIN, Inc., Tokyo (JP)

(72) Inventors: Denys Kanunikov, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 248 days.

(21) Appl. No.: 17/003,774

(22) Filed: Aug. 26, 2020

(65) Prior Publication Data

US 2021/0129334 A1 May 6, 2021

Related U.S. Application Data

(63) Continuation of application No. 16/905,837, filed on Jun. 18, 2020, now Pat. No. 11,020,854.

(Continued)

(51) Int. Cl.
*G06F 7/00* (2006.01)
*B25J 9/16* (2006.01)
(Continued)

(52) U.S. Cl.
CPC .......... *B25J 9/1671* (2013.01); *B25J 9/1666* (2013.01); *B25J 9/1697* (2013.01); *B65G 61/00* (2013.01);
(Continued)

(58) Field of Classification Search
CPC ...... B25J 9/1671; B25J 9/1666; B25J 9/1697; B25J 9/1687; B25J 9/1602; B25J 9/1664; B25J 15/0616; B25J 9/161; B25J 9/1676; B25J 9/1694; B65G 61/00; B65G 2203/041; B65G 1/00; B65G 1/04; B65G 47/905; B65G 47/917; B65G 57/03; B65G 57/22; B65G 2814/0304; G05B 19/4155; G05B 2219/39101; G05B 2219/40006; G05B 2219/40067; G06T 7/0004; G06T 7/70; G06T 7/62; G06T 7/74; G06T 2200/04; G06T 2207/10024; G06T 2207/10028; B65B 35/50
(Continued)

(56) References Cited

U.S. PATENT DOCUMENTS

2020/0398441 A1* 12/2020 Marchese .............. B25J 9/1612
2021/0053216 A1* 2/2021 Diankov ................ B25J 9/1664

FOREIGN PATENT DOCUMENTS

| JP | 2003335417 A | 11/2003 |
|----|---|---|
| JP | 2004307111 A | 11/2004 |
| JP | 2018039614 A | 3/2018 |

OTHER PUBLICATIONS

Decision to Grant dated Aug. 28, 2020 for Japanese patent application No. 2020-130375, original and translation, 6 pages.

(Continued)

*Primary Examiner* — Yolanda R Cumbess
(74) *Attorney, Agent, or Firm* — Perkins Coie LLP

(57) ABSTRACT

A system and method for operating a robotic system to place objects into containers that have support walls is disclosed. The robotic system may detect an unexpected condition associated with a container during or before a real-time operation. Accordingly, the robotic system may dynamically adjust an existing packing plan based on detecting the unexpected condition.

20 Claims, 15 Drawing Sheets

Related U.S. Application Data

(60) Provisional application No. 62/931,161, filed on Nov. 5, 2019.

(51) Int. Cl.
  *B65G 61/00* (2006.01)
  *G06T 7/70* (2017.01)
  *G05B 19/4155* (2006.01)
  *G06T 7/00* (2017.01)

(52) U.S. Cl.
  CPC ........ *G05B 19/4155* (2013.01); *G06T 7/0004* (2013.01); *G06T 7/70* (2017.01); *B65G 2203/041* (2013.01); *G05B 2219/39101* (2013.01)

(58) Field of Classification Search
  USPC .............................. 700/213–217, 228, 229
  See application file for complete search history.

(56) References Cited

OTHER PUBLICATIONS

U.S. Appl. No. 16/905,837, filed Jun. 18, 2020, First Inventor: Denys Kanunikov, 125 pages.
Notice of Allowance dated Jan. 22, 2021 for U.S. Appl. No. 16/905,837, filed Jun. 18, 2020, First Inventor: Denys Kanunikov, 13 pages.

* cited by examiner

ROBOTIC SYSTEM WITH DYNAMIC PACK ADJUSTMENT MECHANISM AND METHODS OF OPERATING SAME

CROSS-REFERENCE TO RELATED APPLICATION(S)

This application is a continuation of U.S. patent application Ser. No. 16/905,837, filed Jun. 18, 2020, which claims the benefit of U.S. Provisional Patent Application Ser. No. 62/931,161, filed Nov. 5, 2019, both of which are incorporated by reference herein in their entirety.

TECHNICAL FIELD

The present technology is directed generally to robotic systems and, more specifically, to systems, processes, and techniques for packing objects within containers.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex and intricate tasks. For example, robots often lack the granularity of control and flexibility in the executed actions to fully utilize available resources. Also, robots often are unable to account for deviations or uncertainties that may result from various real-world factors. Accordingly, there remains a need for improved techniques and systems for controlling and managing various aspects of the robots to complete the tasks despite the various real-world factors.

DETAILED DESCRIPTION

Figure 1:
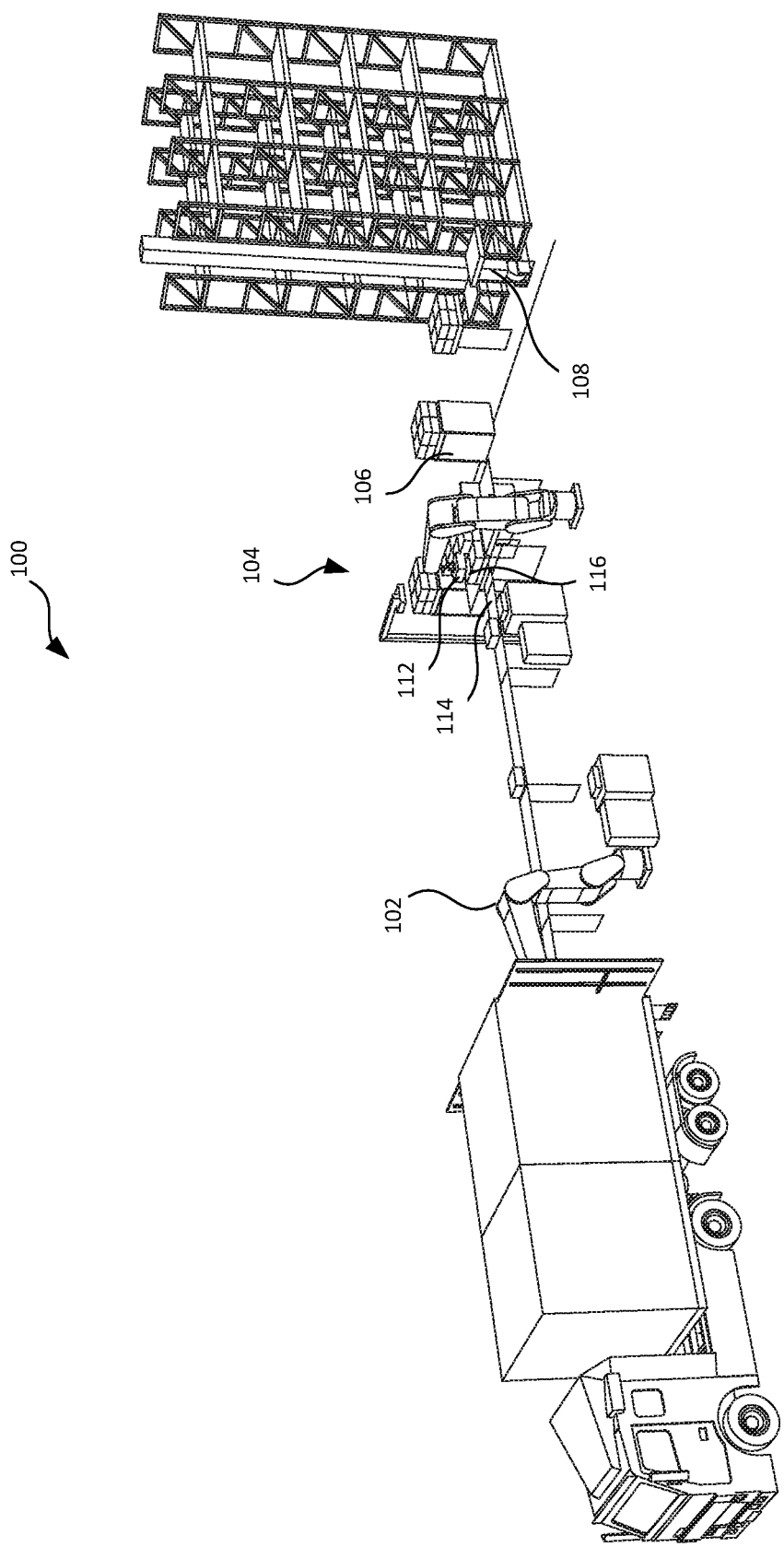
FIG. 1 is an illustration of an example environment in which a robotic system with a wall-based packing mechanism may operate.

Systems and methods for robotic systems with dynamic pack adjustment mechanisms are described herein. A robotic system (e.g., an integrated system of devices that executes one or more designated tasks) configured in accordance with some embodiments provides enhanced control, usability, and flexibility by packing objects (e.g., packages, boxes, cases, etc.) with respect to container walls. For example, the robotic system can stack the objects in layers, with one or more objects above a base layer (1) contacting or leaning against one or more container walls and/or (2) overhanging (e.g., laterally protruding beyond peripheral edge(s) of) one or more base layer object(s) closest to the container wall.

The robotic system can pack the objects with respect to the container walls (e.g., vertically-oriented walls or dividers of carts, cages, bins, boxes, etc.) based on discretizing various packing components. Some examples of the packing components can include objects (e.g., registered or expected objects and/or unrecognized objects), containers or packing platforms configured to receive the objects, and/or robotic manipulators (e.g., an end-effector, a robotic arm, a portion thereof, or a combination thereof). The robotic system can generate discretized models of the packing components.

Using the discretized models, the robotic system can derive a packing plan that identifies placement locations of objects in the containers. The packing plan can include the placement locations that stack objects on top of each other (e.g., in layers). The robotic system can calculate/estimate separation distances between objects and/or between objects and the container walls, overhang distances or portions, other object-to-object measurements, and/or other object-to-container measurements. Based on the calculations, the robotic system can derive the packing plan with placement locations where the placed object contacts/leans on the container wall and/or overhangs one or more objects below. In some embodiments, the robotic system can derive and utilize center-of-mass (CoM) location, rotation points, mass/weight, dimensions, and/or other physical traits of the objects to derive the packing plan.

In some embodiments, the robotic system can derive motion plans that correspond to the packing plan. Each motion plan can correspond to an object and include a motion path or a corresponding set of commands/settings for the object and/or robotic units (e.g., a robotic arm and/or an end-effector). The motion plan can correspond to operations of the robotic units to approach an object at its starting location, grip the object with the end-effector, lift and transfer the object to its placement location, and release/place the object at the placement location.

The robotic system can implement the packing plan, such as by communicating one or more of the motion plans and/or corresponding commands/settings to targeted robotic units. The robotic system can further implement the packing plan by executing the commands/settings at the targeted robotic units. Accordingly, the robotic system can operate the robotic units to transfer the objects from the start locations to the respective placement locations according to the packing plan.

The robotic system can be configured to dynamically adjust the packing plan, such as to account for unexpected conditions (e.g., container abnormalities). For example, containers (e.g., two-walled carts and/or three-walled cages) may include vertically-oriented walls that may be deformed, bent, misaligned, partially closed, and/or otherwise physically different than expected conditions. Such unexpected conditions may affect a placement area within the container and/or approach paths into the placement area. The robotic system can detect such unexpected conditions and dynamically adjust the packing plan. As described in detail below, the robotic system can use the discretized models to determine an axis aligned bounding box (AABB), offset the AABB, and/or validate the offset AABB. Also, based on the dynamic adjustments, the robotic system can update the motion plans to account for the unexpected conditions. In some embodiments, the robotic system can start from adjusted object placement locations and incrementally move backwards to the starting locations to determine the motion plans. The robotic system can place discretized model of the end-effector along the reverse-trace path to update and/or validate the motion plans.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a dynamic pack adjustment mechanism may operate. The robotic system 100 can include and/or communicate with one or more units (e.g., robots) configured to execute one or more tasks. Aspects of the dynamic pack adjustment mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
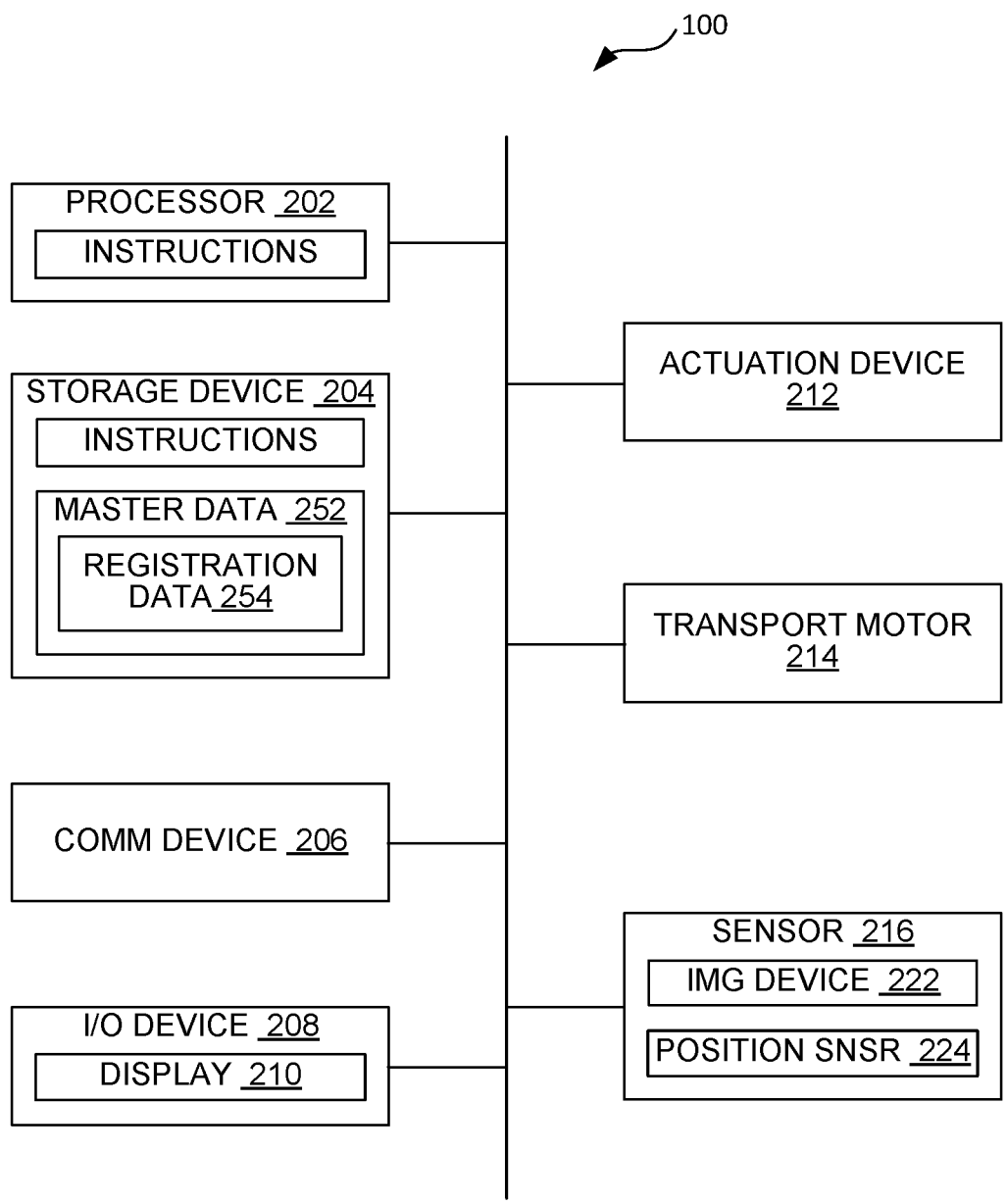
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (e.g., via the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Example Object Transfer and Packing

Figure 3:
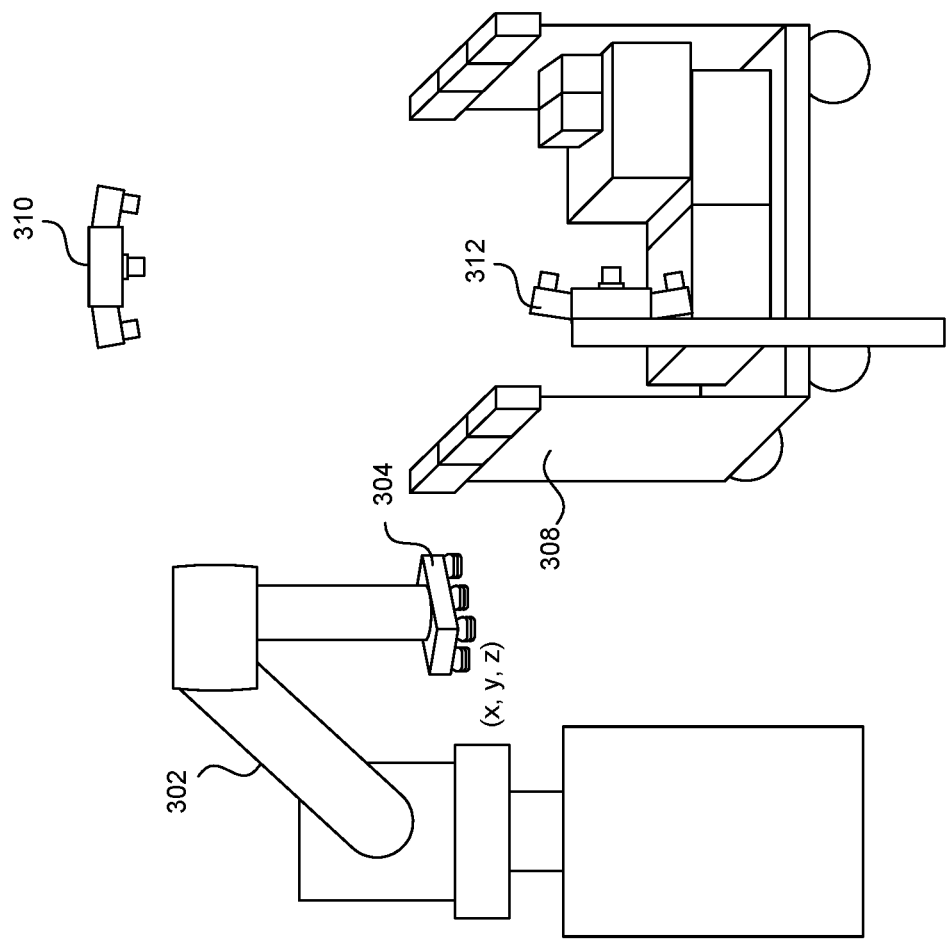
FIG. 3 is an illustration of the robotic system in accordance with one or more embodiments of the present technology.
Figure 3:
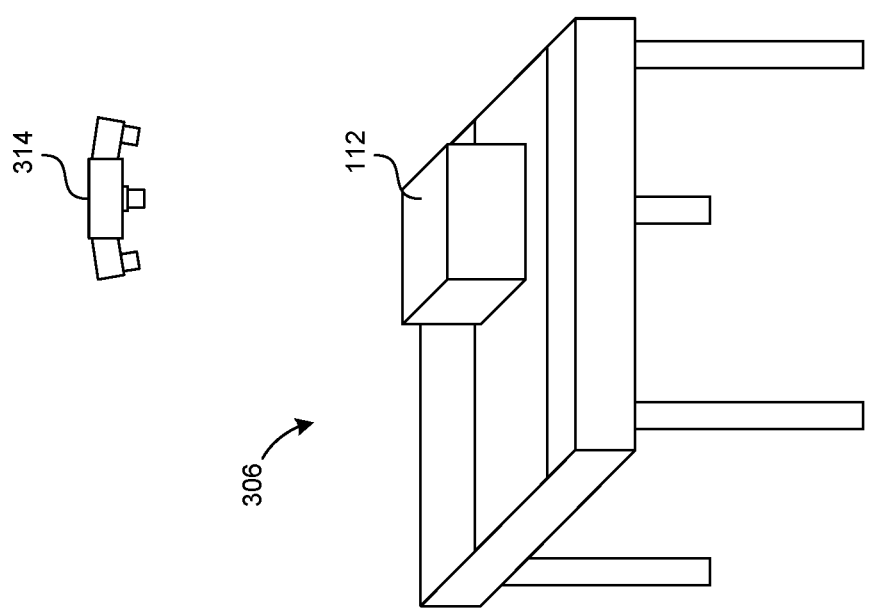

FIG. 3 is an illustration of the robotic system 100 of FIG. 1 in accordance with one or more embodiments of the present technology. The robotic system 100 can include or be communicatively coupled to a robotic arm 302 that includes an end-effector 304 (e.g., a gripper). The robotic arm 302 can be one of or a part of one of the robotic units illustrated in FIG. 1 (e.g., an instance of the transfer unit 104 of FIG. 1). For example, the robotic arm 302 can include an industrial robotic system employed in industrial applications including package handling applications. The robotic arm 302 may be articulated along or about a number of axis, such as for six-axis industrial robotic arm structures.

The robotic arm 302 can be configured to transfer the target object 112 between the start location 114 of FIG. 1 and the task location 116 of FIG. 1. As illustrated in FIG. 3, the start location 114 can correspond to a location (e.g., an end/ingress point) on a conveyor 306 (e.g., an instance of the transport unit 106 of FIG. 1). The task location 116 for the robotic arm 302 can be a placement platform 308 (e.g., a container, such as a cart or a cage) or a location therein. For example, the robotic arm 302 can be configured to pick the object 112 from the conveyor 306 and place them in/on the placement platform 308 for transport to another destination/task.

The end-effector 304 can include any component or components coupled to a distal end of the robotic arm 302. The end-effector 304 can be configured to interact with one or more objects. In some embodiments, the end-effector 304 can include a force-torque (F-T) sensor (not shown), an arm interface, a gripper system, and/or a gripper interface. For illustrative purposes, the end-effector 304 is shown having rows of suction cups, however it is understood that the end-effector 304 can have a different configuration. For example, the end-effector 304 can have a suction pad with integrated suction channels, a pincher type gripping device, or any other type of gripping system for grabbing objects.

The robotic system 100 can use one or more of the sensors 216 of FIG. 2 in performing the transfer operation with the robotic arm 302. The robotic system 100 can include or be coupled to a set of sensors (e.g., 2D and/or 3D sensors, such as cameras and/or depth sensors) at or about the start location 114 and/or the task location 116. In some embodiments, the robotic system 100 can include or be coupled to a top-view sensor 310 over and directed at the task location 116 and/or a side-view sensor 312 adjacent to and directed laterally toward the task location 116. The robotic system 100 can similarly include one or more source sensors 314 directed to the start location 114. The sensors can be configured to image and/or analyze corresponding locations. For example, the top-view sensor 310 can generate and/or process image data depicting a top-view of the placement platform 308 and/or objects thereon. Also, the side-view sensor 312 can generate and/or process image data depicting a side-view of the placement platform 308 and/or objects thereon.

The robotic system 100 can use the image data from the sensors 216 to perform tasks, such as for transferring the objects from the start location 114 to the task location 116. Accordingly, the robotic system 100 can use the image data to derive and implement one or more packing plans and/or motion plans to perform the tasks. As described in further detail below, the robotic system 100 can derive and/or dynamically adjust packing plans and corresponding motion plans to place objects on or within the placement platform 308. The plans can correspond to one or more objects being placed on top of other objects (e.g., stacking). The robotic system 100 may derive and/or adjust the various plans such that the stacked object (e.g., the object placed on top of a lower object) is placed such that peripheral portion(s) of the object laterally extends beyond peripheral portion(s) of the lower object. In some instances, the robotic system 100 may derive and/or adjust the plans such that the protruding stacked object contacts and/or leans against a vertically-oriented wall or divider of the placement platform 308. Accordingly, the robotic system 100 can derive the packing plans and the motion plans to effectively increase the placement zone within the placement platform 308 and use the vertically-oriented walls or dividers to support objects therein.

Also described in detail below, the robotic system 100 can dynamically adjust the packing plans and/or the motion plans based on detecting abnormalities associated with the placement platform 308. For example, the robotic system 100 can obtain real-time images of the actual placement platforms (e.g., carts and/or cages) as they are placed during operation of the robotic system 100. The robotic system 100 can analyze the real-time images to detect abnormalities in the placement platforms, such as reduction in a placement zone (e.g., in comparison to a predetermined or an expected space) caused by partial-opening, misalignment, and/or warpage in the vertical walls. Based on detecting the anomalies in real-time, the robotic system 100 can dynamically update the plans (e.g., at the deployment site and/or immediately before implementing/triggering the initially derived plans). In some embodiments, the robotic system 100 can test and verify various shifted placement locations. The robotic system 100 can further test updated motion plans that correspond to the placement location according to the real-time conditions.

The robotic system 100 can similarly use one or more of the sensors 216 to locate and track the robotic arm 302, the end-effector 304, and/or the target object 112. In some embodiments, the robotic system 100 can track the location (shown as a coordinate set (x, y, z) in FIG. 3) based on readings from positional sensors. Also, the robotic system 100 can calculate and track the location based on the communicated or executed commands/settings. The robotic system can determine and track the locations according to a predetermined coordinate system or a grid.

Example Placement Platforms

Figure 4B:
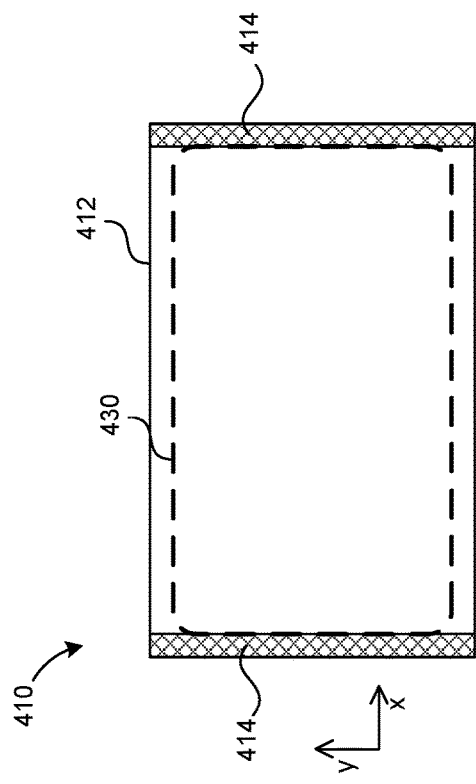
FIGS. 4A-4D are illustrations of example object containers in accordance with one or more embodiments of the present technology.
Figure 4D:
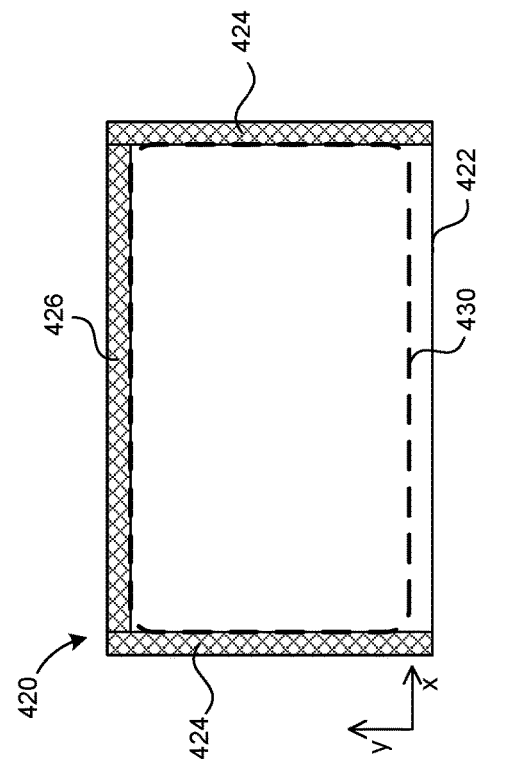
Figure 4A:
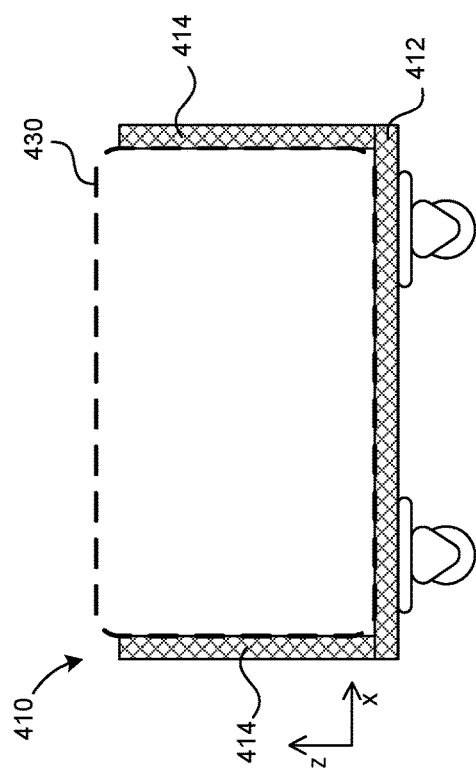

FIGS. 4A-4D are illustrations of example object containers (e.g., the placement platform 308 of FIG. 3) in accordance with one or more embodiments of the present technology. FIG. 4A is a side-view of an example cart 410, and FIG. 4B is a top-view of the cart 410. The cart 410 can be an object container that has a cart-base 412 and a pair of opposing cart-sidewalls 414. For example, the cart-base 412 can have a footprint (e.g., a perimeter shape or a silhouette from a top or a bottom view) with a rectangular shape. The cart-sidewalls 414 can be attached to/over or integral with a pair of opposing peripheral edges of the cart-base 412. Space above the remaining peripheral edges of the cart-base 412 can remain open or unobstructed.

Figure 4C:
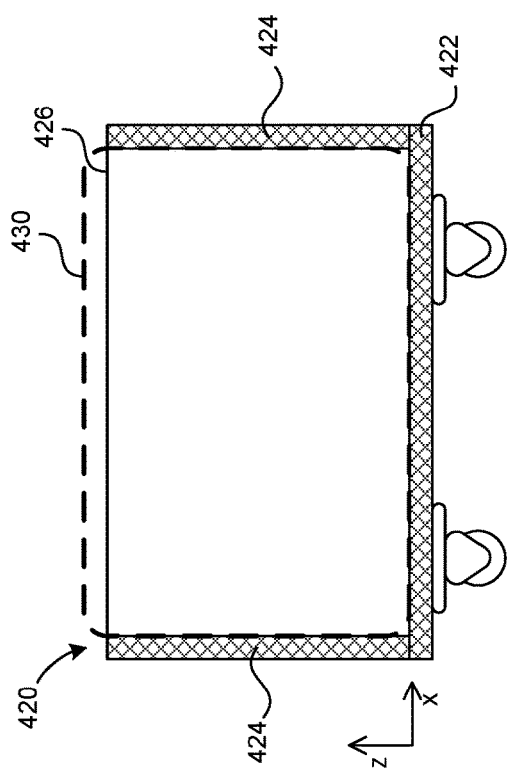

FIG. 4C is a side-view of an example cage 420, and FIG. 4D is a top-view of the cage 420. The cage 420 can be an object container that has a cage-base 422 and three vertically-oriented walls (e.g., a pair of opposing cage-sidewalls 424 and a cage-backwall 426). For example, the cage-base 422 can have a footprint with a rectangular shape. The cage-sidewalls 424 can be attached to/over or integral with a pair of opposing peripheral edges of the cage-base 422. The cage-backwall 426 can be attached to/over or integral with one of the remaining peripheral edges of the cage-base 422. The space opposite the cage-backwall 426 can remain open or unobstructed.

Each placement platform 308 can include an expected placement zone 430 that can be occupied by carried/loaded objects. In other words, the expected placement zone 430 can represent an intended or a predetermined cargo space for the corresponding placement platform 308. Referring to FIGS. 4A-4D together, the expected placement zone 430 for the cart 410 and the cage 420 can extend up to and/or be bounded by the vertically-oriented walls (e.g., the cart-sidewalls 414, the cage-sidewalls 424, and/or the cage-backwall 426). Accordingly, the robotic system 100 may derive, implement, and/or execute plans to place objects within the cart 410 and/or the cage 420 such that the objects contact and/or are supported by the vertically-oriented walls. The placement zone 430 may laterally extend (e.g., along y-axis) up to (e.g., before or coplanar/coincident with) or past the open/unobstructed edges of the cart-base 412 and/or the cage-base 422. Similarly, the placement zone 430 may vertically extend (e.g., along z-axis) up to or above a top edge of the vertically-oriented walls. In other words, in some instances, the robotic system 100 may derive, implement, and/or execute plans to place objects such that at least a portion of the placed object is above the top edge of the vertically-oriented walls of the corresponding placement platform 308.

Example End-Effector

Figure 5A:
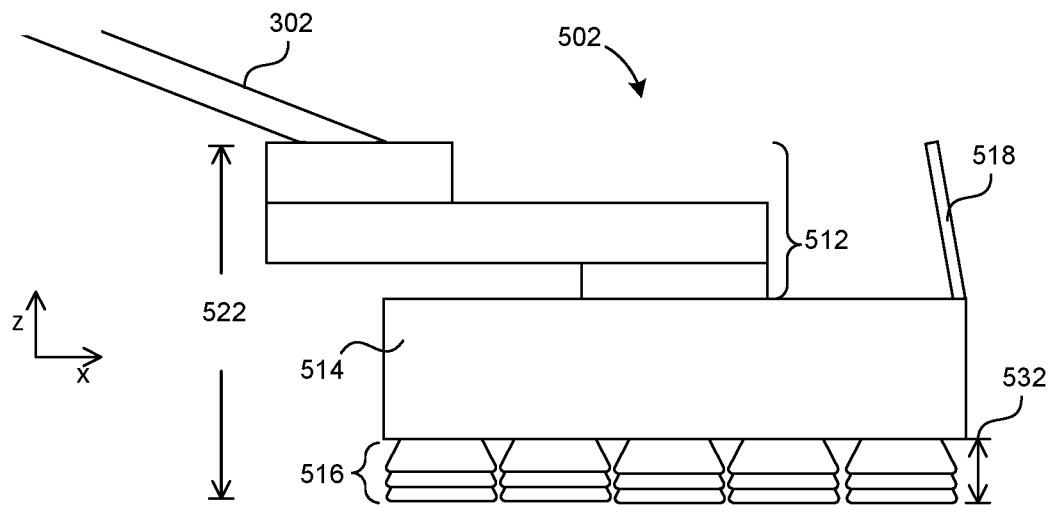
FIGS. 5A-5C are illustrations of an example end-effector in accordance with one or more embodiments of the present technology.
Figure 5B:
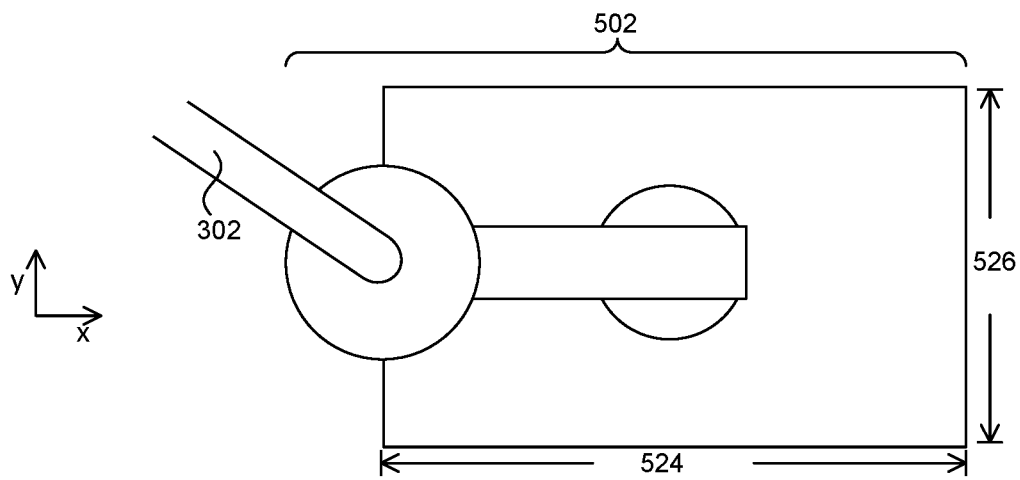
Figure 5C:
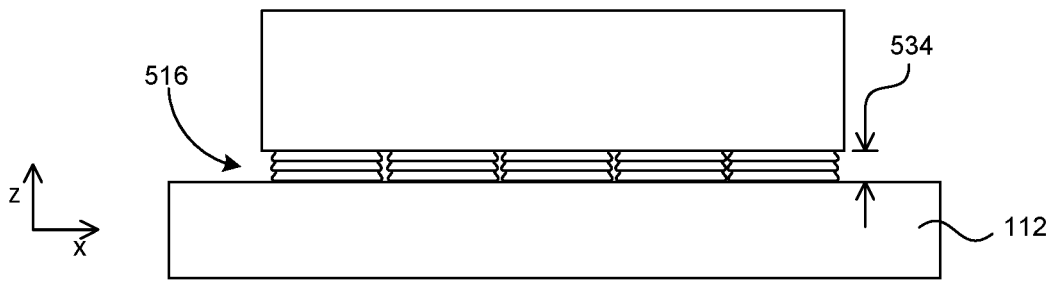

FIG. 5A-5C are illustrations of an example end-effector (e.g., the end-effector 304 of FIG. 3) in accordance with one or more embodiments of the present technology. FIGS. 5A and 5B are a side-view and a top-view, respectively, of an example gripper assembly 502 and a portion of the robotic arm 302. In some embodiments, the gripper assembly 502 can correspond to a vacuum-based gripper configured to create a vacuum between the gripper assembly 502 and an object, thereby affixing the object relative to the gripper assembly 502 (e.g., gripping the object).

The gripper assembly 502 may include structural members 512 (e.g., rotational joints, extension arms, etc.) that structurally couple the robotic arm 302 to a gripper 514. The gripper 514 can include circuits, motors, and/or other mechanical components configured to operate a gripping interface 516 to contact and affix one or more targeted objects relative to the gripper 514. In some embodiments, the gripping interface 516 can include suction cups that are controlled by actuators and/or other mechanical components in the gripper 514. The gripper 514 can be configured to form and control a vacuum within a space bounded by each of the suction cups and the contacted surface, thereby affixing and gripping the targeted object.

The gripper assembly 502 may include other components. In some embodiments, the gripper assembly 502 may include a calibration board 518 configured to provide functionalities used to determine location of the gripper assembly 502 and/or one or more portions thereof. The calibration board 518 can be used as a reference in obtained images and/or provide detailed location information for the calibration process. The calibration board 518 may be attached to or integral with a peripheral edge of the gripper 514 and extend away from the peripheral edge. In some embodiments, the calibration board 518 can extend vertically away from a top surface of the gripper 514. The calibration board 518 may also extend laterally toward or away from the structural members 512 and/or a center portion of the gripper 514.

The gripper assembly 502 can have dimensions that are predetermined or known by the robotic system 100. For example, the gripper assembly 502 can have an assembly height 522, a base length 524, and/or a base width 526. The assembly height 522 can correspond to a distance (e.g., along a z-axis) between an outermost portion of the structural members (e.g., a top portion or a portion connected to the robotic arm 302) and a portion of the gripping interface 516 opposite the outermost portion. The base length 524 and the base width 526 can correspond to lateral dimensions of the gripper 514 measured along orthogonal directions (e.g., the x-axis and the y-axis). The dimensions can correspond to a predetermined pose/arrangement of the gripper assembly 502 associated with engaging or gripping the targeted object.

In some embodiments, one or more dimensions of the gripper assembly 502 may change while gripping an object. FIG. 5C is an illustrative side-view of the gripper assembly 502 after gripping and lifting the target object 112 in accordance with one or more embodiments of the present technology. For vacuum-based grippers, an extended interface height 532 may correspond to a height of the suction cups in their initial and unengaged state. In contacting, creating, and maintaining the vacuum within the suction cups, the shape of suction cups may deform and/or compress. Accordingly, when the gripper 514 engages and grips the target object 112, the gripping interface 516 may correspond to an engaged interface height 534 that is less than the extended interface height 532. Accordingly, the assembly height 522 may reduce when engaging/gripping the target object 112. The robotic system 100 can determine or identify the change in the height (e.g., the engaged interface height 534) to accurately determine and track the locations of the gripper 514, the target object 112, and/or portions thereof. In some embodiments, the robotic system 100 can have the engaged interface height 534 predetermined and stored in the storage devices 204 of FIG. 2. In some embodiments, the robotic system 100 can determine the engaged interface height 534 in real-time (e.g., during deployment/operation) based on capturing and analyzing image data from the side-view sensor 312 of FIG. 3 after gripping the target object 112 and lifting the gripper 514 by a predetermined height.

Example Discretization Models

Figure 6:
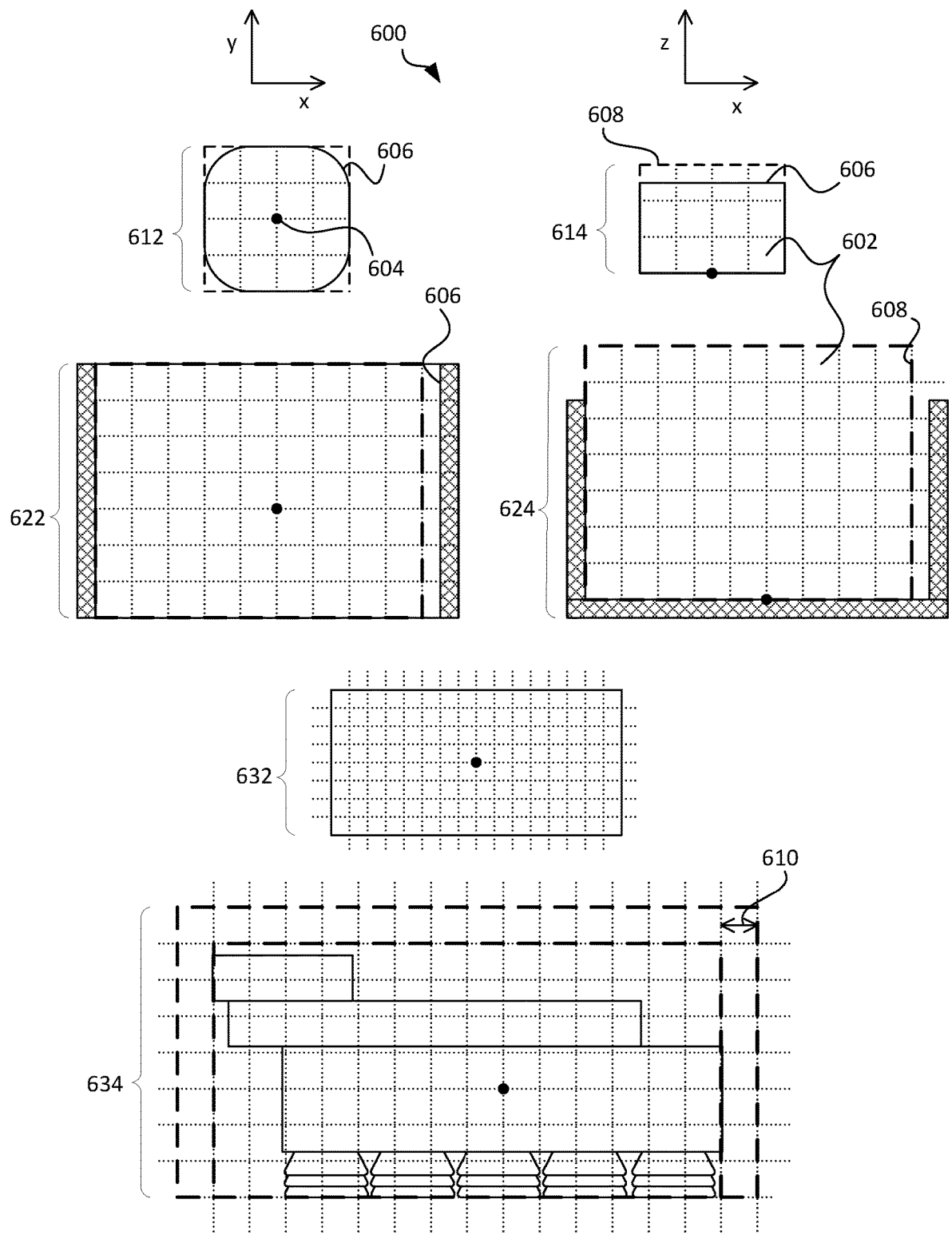
FIG. 6 is an illustration of an example discretized models of packing components in accordance with one or more embodiments of the present technology.

FIG. 6 is an illustration of example discretized models 600 of packing components in accordance with one or more embodiments of the present technology. The discretized models 600 can include pixelated representations of the packing components, such as the manipulated/packed objects (e.g., the registered objects), robotic units or portions thereof, and/or object receptacles (e.g., the placement platform 308 of FIG. 3). For example, the discretized models 600 can describe physical sizes/shapes of the packing components according to discretization units 602 (i.e., one discrete area/space corresponding to predetermined dimensions). In other words, the discretization units 602 can correspond to unit pixels, such as polygons (e.g., squares or cubes) having one or more dimensions corresponding to discretization length.

Dimensions of the discretization units 602 can include a length that is preset by a system operator, a system designer, a predetermined input/setting, or a combination thereof. In some embodiments, the dimensions of the discretization units 602 can be adjusted dynamically during operation of the robotic system 100. In some embodiments, the size of the discretization units 602 (e.g., the discretization unit) can change according to dimensions of the objects and/or dimensions of the loading platforms. The size of the discretization units 602 (e.g., pixels) can also be adjusted (via, e.g., a preset rule/equation and/or operator selection) to balance required resources (e.g., computation times, required memory, etc.) with packing accuracy. When the size decreases, the computation times and the packing accuracy can increase based on the resulting increased data. Accordingly, discretization of the packing tasks (e.g., the target packages, the end-effector assembly, and the packing platforms) using adjustable discretization units 602 provides increased flexibility for palletizing the packages. The robotic system 100 can control a balance between the computation resources/time with the packing accuracy according to unique scenarios, patterns, and/or environments.

The robotic system 100 can describe or represent the robotic arm 302 of FIG. 3, the end-effector 304 of FIG. 3, the target object 112 of FIG. 1, the placement platform 308 (e.g., the cart 410 of FIG. 4A and/or the cage 420 of FIG. 4B), already placed objects, and/or portions thereof via known or predetermined units. Thus, the robotic system 100 can transform continuous real-world space/area into computer-readable digital information. Further, the discretized data can provide reduced computational complexity in describing spaces occupied by the packaging components and for comparing various package placement locations. For example, package dimensions can correspond to integer numbers of discretization units rather than real-world decimal numbers, thereby reducing the complexity of related mathematical computations.

The robotic system 100 can utilize the discretized models 600 generated by a discretization mechanism (e.g., a process, a circuit, a function, and/or a routine). In some instances, the discretized models 600 may be provided by an external source (e.g., a manufacturer, a distributor, a customer, etc.). Also, the robotic system 100 may generate the discretized models 600 based on segmenting target data (e.g., image data, shape templates, and/or other digitized physical representations) representative of the packing components. The robotic system 100 can identify actual features 606 (e.g., edges and/or corners) in the segmenting target data, such as using edge detection mechanisms (e.g., a Sobel filter). Based on the identified actual features 606 (shown using solid lines), the robotic system 100 can determine a reference point/edge 604 (e.g., a corner, a center portion, a central-portion, a visual mark, and/or a locating device) in the segmenting target data. The robotic system 100 can use the reference location 604 as an origin point and accordingly divide the segmenting target data using predetermined dimensions and/or directions that correspond to the discretization units 602 (shown using dotted lines). The resulting segments can be the discretized/pixelated units of the imaged component. Thus, the robotic system 100 (e.g., via the processors 202 of FIG. 2) can map continuous surfaces/edges of real-world objects (e.g., packages, the robotic arm, the gripper, one or more portions thereof, and/or other objects associated with the task) into discrete counterparts (e.g., unit lengths and/or unit areas).

In some instances, the actual features 606 may not coincide with discretization units 602. In other words, the packing component may have a dimension that has a decimal/fractional component of the discretization units (e.g., 1.2 units or ¾ unit). The robotic system 100 can generate the discretized models 600 based on rounding up or down according to the context. For example, the discretized models 600 can be or include model objects (e.g., the target object 112 of FIG. 1), the placement platform 308 of FIG. 3, the robotic arm 302 of FIG. 3, and/or the end-effector 304 of FIG. 3. For components entering into the object receptacles (e.g., the robotic arm 302, the end-effector 304, and/or the objects), the robotic system 100 may generate the corresponding discretized models 600 by rounding up the dimensions to the quantity of the discretization units 602. In other words, the robotic system 100 can generate the discretized models 600 with model boundaries 608 (shown using dashed lines) beyond the actual features 606 of the modeled components that go into the cart 410 of FIG. 4 and/or the cage 420 of FIG. 4. For the object receptacles (e.g., the placement platform 308, such as the cart 410 and/or the cage 420), the robotic system 100 may generate the corresponding discretized models 600 by rounding down the dimensions to the quantity of the discretization units 602. In other words, the robotic system 100 can generate the discretized models 600 before or between the actual features 606 of the modeled components.

The robotic system 100 may generate the discretized models 600 with the model boundary 608 beyond (e.g., separated from) the actual features 606 by a separation distance 610. For example, the separation distance 610 can correspond to an added buffer such that the robotic system 100 models or accounts for a larger space than the actual component, such as for the end-effector 304. Accordingly, the robotic system 100 can ensure that the modeled component does not contact or collide with other objects/structures during operation (e.g., while moving the components). Thus, the robotic system 100 can provide decreased collision rates using the discretized models 600 generated according to the separation distance 610. Also, in some embodiments, the robotic system 100 can generate the discretized models 600 having rectangular cross-sectional shapes with the model boundaries 608 coinciding with or based on outer-most portions of the modeled components. Accordingly, the robotic system 100 can provide less complex or simpler processing (i.e., in comparison to considering all edges/corners/features) for testing locations/motions for the modeled components.

In some embodiments, the discretized models 600 may be predetermined or generated off-line (e.g., independent of and before a corresponding operation/implementation) and stored in the master data 252 for access during deployment or operation of the robotic system 100. In other embodiments, the discretized models 600 may be generated in real-time (e.g., during operation) based on obtaining image data representative of the start location 114 and/or the task location 116.

The discretized models 600 can represent the shapes, the dimensions, etc., of the packaging components in 2D and/or 3D. For example, the discretized models 600 can include an object model (e.g., an object footprint model 612 and/or an object profile model 614) for each instance or type of registered or imaged object. Also, the discretized models 600 can include a container model (e.g., a container footprint model 622 and/or a container profile model 624) for each instance or type of the placement platform 308. The container models 622 and 624 can represent a placement surface (e.g., an inner bottom surface of an object receptacle having a lateral enclosure as illustrated in FIGS. 4A-4D) according to the discretization unit 602. The container models 622 and 624 can be based known or standard-size object receptacles. Moreover, the discretized models 600 can include a gripper footprint model 632 and/or a gripper profile model 634 that represent portions of robotic units used to perform tasks associated with placing the objects (e.g., the target objects 112) on/in the placement platform 308. For example, the gripper models 632 and/or 634 can represent the end-effector 304, the robotic arm 302, and/or portions thereof.

The footprint models can correspond to perimeters of the modeled components along a lateral plane (e.g., x-y plane). The profile models can correspond to perimeters of the modeled components along a vertical plane (e.g., x-z and/or y-z plane). In some embodiments, the discretized models 600 can include 3-D models.

Example Placement Computations

Figure 7A:
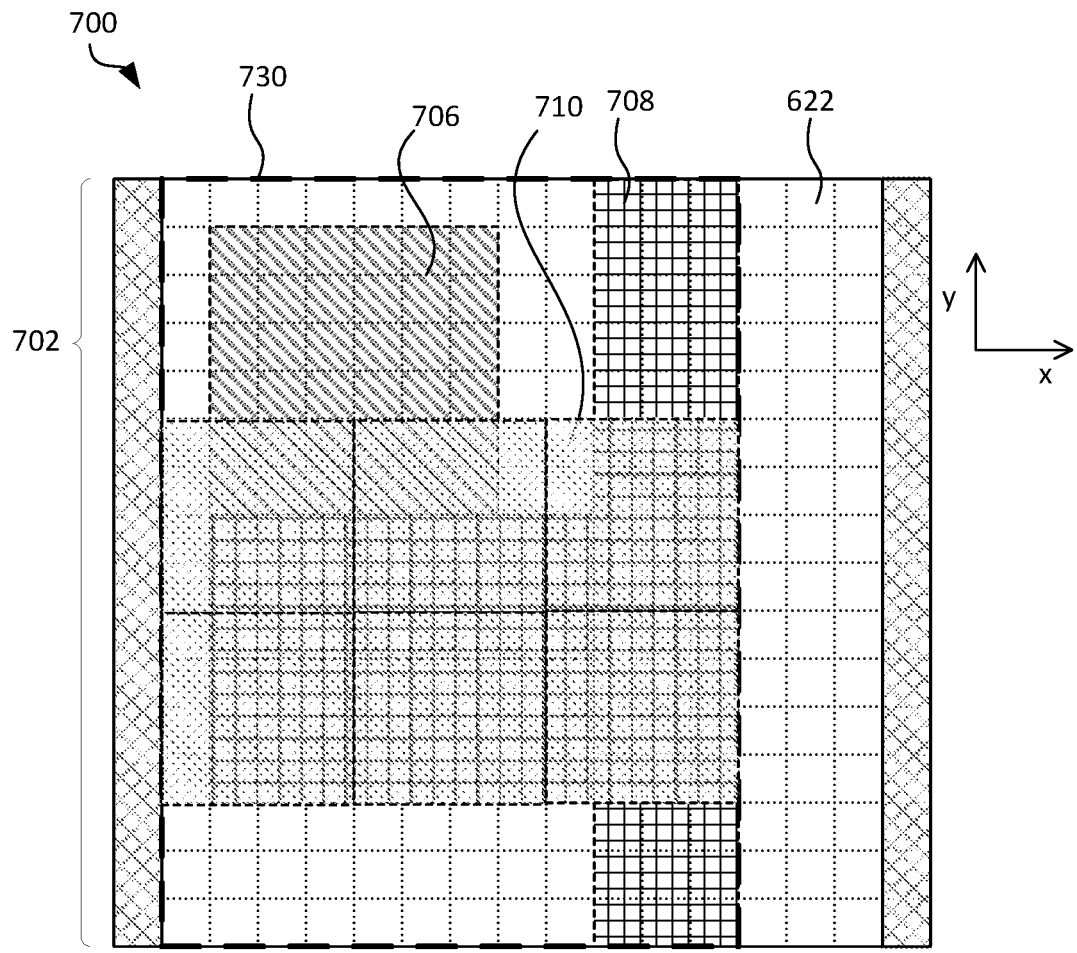
FIG. 7A is an illustration of an example packing plan in accordance with one or more embodiments of the present technology.
Figure 7A:
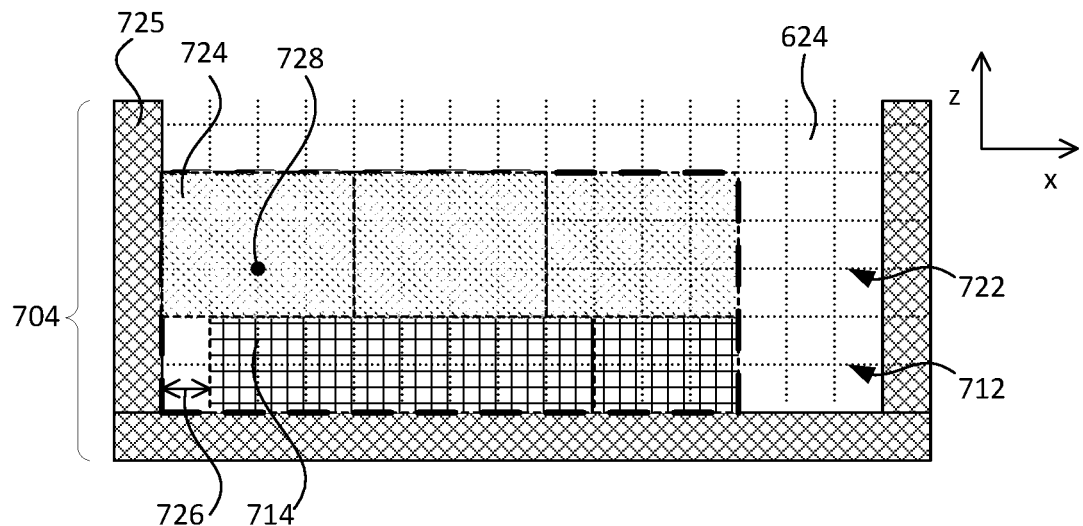

FIG. 7A is an illustration of an example packing plan 700 in accordance with one or more embodiments of the present technology. The robotic system 100 can use the discretized models 600 of FIG. 6 to derive the packing plan 700 that includes derived placement locations for a set of objects within or on the placement platform 308 of FIG. 3 (e.g., a container). The packing plan 700 can represent the placement locations and/or the placed objects in 2D and/or 3D. In some embodiments, the packing plan 700 can be a 3D model. The packing plan 700 can correspond to a top-view 702 and/or a side-view 704 that represents lateral and/or vertical occupancies of objects placed within the expected placement zone 430 of FIG. 4A.

For the example illustrated in FIG. 7A, the targeted objects can include objects of first, second, and third types designated to be packed into an instance of the cart 410. Accordingly, the robotic system 100 can derive the packing plan 700 using a first object model 706, a second object model 708, and a third object model 710 corresponding to the first, second, and third object types, respectively, and the container model (e.g., the container footprint model 622 and/or the container profile model 624). The robotic system 100 can derive the packing plan 700 based on deriving, testing, and evaluating various positions of the object models overlaid on the container model. According to the rules and/or conditions described in detail below, the robotic system 100 may derive the packing plan 700 that places the first and second types of objects in the lower layer 712 (e.g., lower-most layer contacting the cart-base 412 of FIG. 4A) and the third type of objects in the stacked layer 722.

The robotic system 100 can derive the packing plan 700 for placing/packing targeted objects in the designated/assigned placement platform 308. The robotic system 100 can derive the packing plan 700 based on overlaying object models (e.g., instances of the object footprint model 612 of FIG. 6 and/or the object profile model 614 of FIG. 6) of the targeted objects on the container model (e.g., the container footprint model 622 of FIG. 6 and/or the container profile model 624 of FIG. 6) of the designated placement platform 308. The robotic system 100 can derive and/or test the corresponding placement locations according to a set of predetermined rules and/or conditions. The robotic system 100 can iteratively derive placement locations for the targeted objects to derive the packing plan 700. The robotic system 100 can further derive the packing plan 700 and/or a corresponding set of motion plans based on minimizing resource expenditures (e.g., number of maneuvers, corresponding durations, etc.), maximizing number of packed objects, and/or minimizing errors/failures (e.g., piece-loss, collisions, etc.).

Further, the robotic system 100 can derive the packing plan 700 for stacking objects on top of each other, such as in layers (e.g., a lower layer 712 and a stacked layer 722). Also, the robotic system 100 can derive the packing plan 700 with objects contacting and/or leaning against the vertically-oriented walls of the container (e.g., the cart-sidewalls 414 of FIG. 4A and/or the cage-sidewalls 424 of FIG. 4C). For example, the lower layer 712 can include a lower-outermost object 714 closest to a support wall 725 (e.g., a vertically-oriented structure of the container that defines or is within the expected placement zone 430 that may be used/designated to contact/support objects) and separated by an object-wall separation 726 (e.g., a distance and/or a number of pixels between the support wall 725 and a nearest peripheral edge/point of a corresponding directly adjacent object). Objects/walls may be directly adjacent when no other object occupies the space between the corresponding pair of objects, such as along a lateral direction. The upper stacked layer 722 can include a stacked object 724 that is at least partially placed on and supported by the lower-outermost object 714. Peripheral portions of the stacked object 724 can laterally protrude beyond a peripheral edge of the lower-outermost object 714. The peripheral edge/surface of the stacked object 724 (e.g., a vertically oriented surface/edge and/or a top corner/edge) can be closer to or contact the support wall 725. The robotic system 100 can derive the packing plan 700 with the placement location for the stacked object 724 (e.g., overhanging/protruding past the lower-outermost object 714 and/or contacting the support wall 725) based on the object-wall separation 726. In some embodiments, when the edge/surface of the nearest object is not parallel with the support wall 725, the robotic system 100 can calculate the object-wall separation 726 as an average of the corresponding distances. The robotic system 100 can further derive the packing plan 700 according to object reference locations 728, such as CoM locations and/or center portions, of the targeted objects. Details regarding the derivation are described below.

In some embodiments, the robotic system 100 can derive and utilize an axis aligned bounding box (AABB) 730 for a set of objects designated for placement in the container. In other words, the AABB 730 can be a designated planar shape (e.g., a rectangle) that encompasses and/or is coincident with outer-most portions of the objects according to the derived placement plan. For the example illustrated in FIG. 7A, the AABB 730 can be a set of rectangles that are aligned according to a set of predetermined axes (e.g., x, y, and z axes) that coincides with outer-most points of the objects in the packing plan 700. The AABB 730 can represent an overall size (e.g., pack size) of the packing plan 700. The robotic system 100 may derive and use the AABB 730 to adjust the packing plan 700 and account for unexpected real-world conditions (e.g., partially-opened containers and/or warped container walls). As described in detail below, the robotic system 100 may derive and use the AABB 730 in altering or shifting the placement or position of the objects (e.g., the packing plan 700). In some embodiments, using the AABB 730, the robotic system 100 can consider the entire stack of objects for the packing plan 700 as a single object. The AABB 730 can be derived according to the discretized units as described above.

Figure 7B:
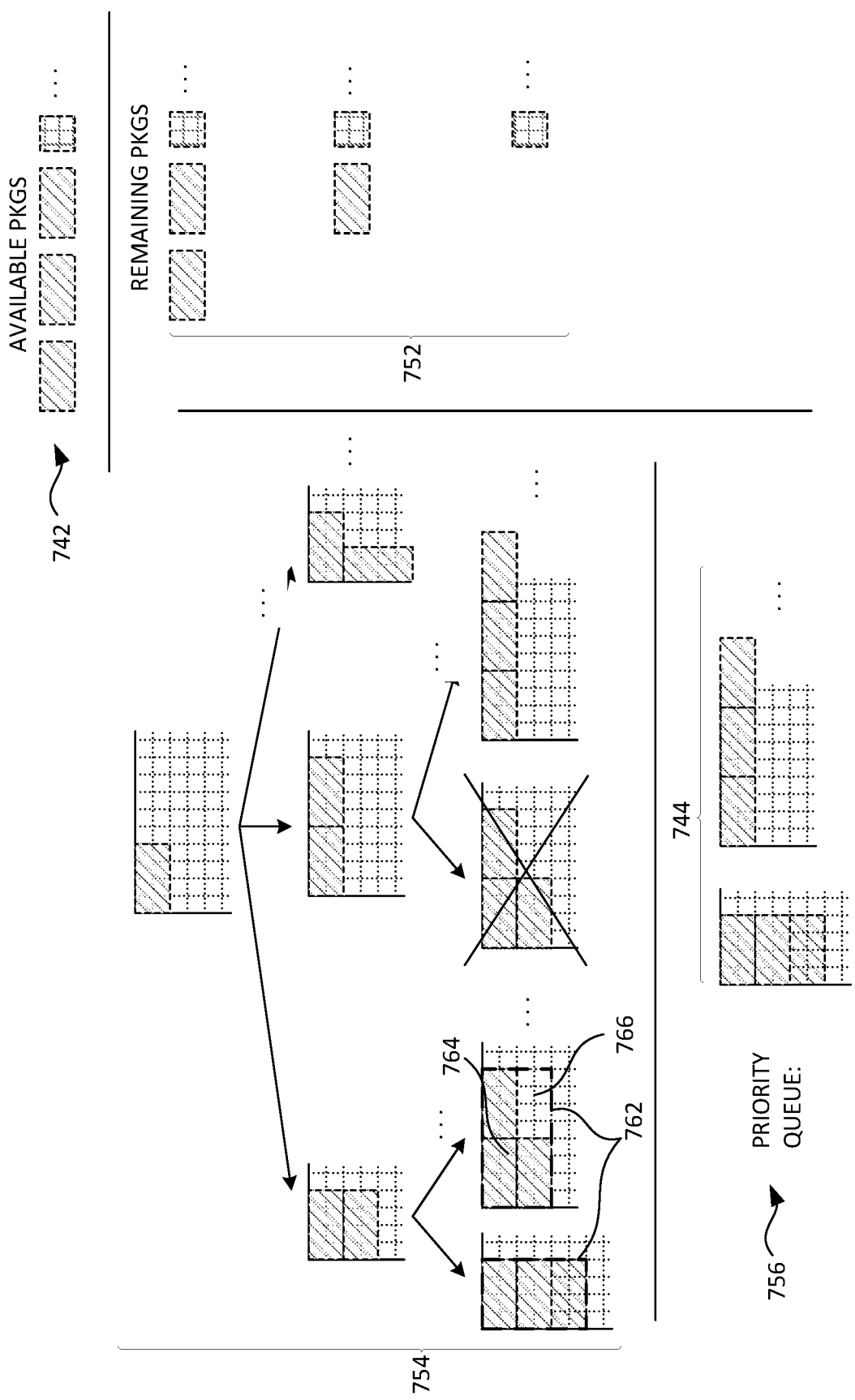
FIG. 7B is an illustration of a placement planning process in accordance with one or more embodiments of the present technology.

FIG. 7B is an illustration of a placement planning process in accordance with one or more embodiments of the present technology. The robotic system 100 of FIG. 1 (via, e.g., the one or more processors 202 of FIG. 2) can derive the packing plan 700 of FIG. 7A for a set of available packages 742. The available packages 742 can correspond to the objects that need to be or are targeted to be packed for an egress shipment and/or for storage. For example, the available packages 742 can correspond to incoming objects received via an ingress shipment and/or stored objects that have been ordered for an egress shipment. In some embodiments, the robotic system 100 can use a shipping manifest, an order list, etc., to identify the available packages 742 in real-time, such as directly in response to (i.e., within a threshold duration from) receiving the manifest, the list, etc. Accordingly, the robotic system 100 may use the identified available packages 742 to derive the packing plan 700 in real-time. As such, the robotic system 100 can use real-time conditions, availability, and/or demands to derive the packing plan 700 instead of off-line packing simulators that utilize a hypothetical number/set/combination of packages to derive plans that are applied regardless of real-time conditions. In some embodiments, the robotic system 100 can use devices (e.g., one or more of the processors 202) located at the location receiving, storing, and/or sending the objects, such as a shipping hub and/or a warehouse. In other embodiments, the robotic system 100 can use the expected conditions to implement packing derivations off-line.

In deriving the packing plans, the robotic system 100 can group and/or sequence the available packages 742. The robotic system 100 can use the ordered set of the available packages 742 to derive the packing plan 700. The robotic system 100 can determine and evaluate unique placement locations/combinations for the available packages 742 to derive the packing plan 700. In other words, the robotic system 100 can determine a set of potential placement combinations 744 and evaluate (e.g., score) them according to a set of predetermined requirements, conditions, weights, costs, subsequent implications, or a combination thereof. Based on the evaluation, the robotic system 100 can select a placement combination to derive the packing plan 700.

In at least one embodiment, the robotic system 100 can derive the packing plan 700 using an algorithm that iteratively evaluates placements of the sequenced packages. As illustrated in FIG. 7B, for example, the robotic system 100 can begin the derivation by determining an initial placement for the first package in the available packages 742. Accordingly, the robotic system 100 can overlap the corresponding discretized object model (e.g., the first object model 706, the second object model 708, and/or the third object model 710 as illustrated in FIG. 7A) over the discretized platform model (e.g., the container models 622 and/or 624 of FIG. 6) at an initial location (e.g., a corner, a middle location, and/or another preset location). The robotic system 100 can track remaining packages 752 based on removing the placed package (e.g., the first package) from the available packages 742.

Based on the initial placement, the robotic system 100 can determine a set of possible placements for the second package in the available packages 742. The robotic system 100 can determine the set of possible placements according to a predetermined rule, pattern, or a combination thereof. For example, the robotic system 100 can determine the placement locations according to a pattern of locations relative to the previously placed package(s) (e.g., relative to the previously placed package(s)). Also, the robotic system 100 can determine the placement locations based on a minimum/maximum separation distance or a lack thereof required between one or more of the packages. Further, the robotic system 100 can determine the placement locations based on rotating the package (i.e., the corresponding discretized object model) according to a predetermined amount, such as 90 degrees. In some embodiments, the robotic system 100 can limit the placement possibilities according to a predetermined threshold and/or pattern. Further, the robotic system 100 can update the remaining packages 752 accordingly.

The robotic system 100 can repeat the above-described process and iteratively process the available packages 742 until a stopping condition is reached. Some examples of the stopping condition can represent that all packages have been placed (i.e., the remaining packages 752 is empty), the placements cannot be improved (e.g., same evaluation score as the previous tier/iteration), no more packages can be placed over the discretized platform model, or a combination thereof.

In some embodiments, the robotic system 100 can track the possible placements and the corresponding potential placement combinations 744 using a search tree 754. A root of the search tree 754 can correspond to the initial placement and each level or tier can include potential placements of the subsequent package in the available packages 742. The different tiers can be connected to form a branch that corresponds to a unique combination of placements for the set of packages.

For potential placements of each package, the robotic system 100 can identify and eliminate (e.g., represented by 'X' in FIG. 7B) redundant footprints. For example, at each tier of the search tree 754, the robotic system 100 can compare (e.g., overlay) the resulting footprints of the potential placement locations/combinations. Based on the comparison, the robotic system 100 can eliminate duplicates of the resulting footprints. In some embodiments, the robotic system 100 can further compare transposed, rotated, and/or mirrored versions of the resulting footprints to eliminate related duplicates. For example, the robotic system 100 can rotate one footprint by ±90 degrees and/or transpose the footprint across one or more mirroring lines (e.g., a diagonal line extending across opposing corners, a bisecting line(s) extending along x and/or y directions, or a combination thereof) and compare it to other footprints.

Also, for potential placements of each package, the robotic system 100 can identify and eliminate placements that violate one or more requirements/constraints. One example of the requirements/constraints can be based on collision probabilities. The robotic system 100 can calculate an approach path for each placement location and a corresponding collision probability according to the pre-existing footprint, one or more dimensions of the packages, a location of the transfer robot, a previous event or history, or a combination thereof. The robotic system 100 can eliminate the placements where the collision probability exceeds a predetermined threshold. Another example of the requirements/constraints can be a supported weight for stacking (i.e., placing directly on/over one or more support packages) the package. For one or more of the packages under the placement location, the robotic system 100 can calculate a support weight (i.e., a combined weight of packages or portions thereof directly over) based on the weight of the placed package. The robotic system 100 can eliminate the placements where the support weight violates (e.g., exceeds or is within a threshold range from) a fragility requirement (e.g., a maximum supportable weight) for one or more of the packages under the placement location.

In some embodiments, the robotic system 100 can track and/or evaluate the placement combinations 744 using a priority queue 756 (e.g., a heap structure etc.). The priority queue 756 can order the placement combinations 744 according to a sequence of preferences. The robotic system 100 can evaluate or score each of the placement combinations 744 according to one or more predetermined criteria. The criteria can include one or more costs associated with already placed items and/or one or more heuristic scores associated with how the current placement affects future placements or possibilities.

One example of the criteria can include maximization of footprint density. The robotic system 100 can calculate the footprint density for an outer perimeter 762 for a grouping of packages. In some embodiments, the outer perimeter 762 can be determined based on exposed/outer perimeter edges of the grouping of packages. The robotic system 100 can further enclose surrounding/related areas by extending two or more edges and finding an intersect and/or by drawing a line that connects one or more corners of the footprint. The robotic system 100 can calculate the footprint density as a ratio between an actual occupied area 764 (e.g., a number of discretization units 602 of FIG. 6 or pixels corresponding to the shaded area) and an empty area 766 (e.g., a number of discretization units 602 corresponding to the enclosed/related areas). The robotic system 100 can be configured to prefer (e.g., by assigning a higher/lower score) to placement plans that minimize the empty area 766.

Figure 7C:
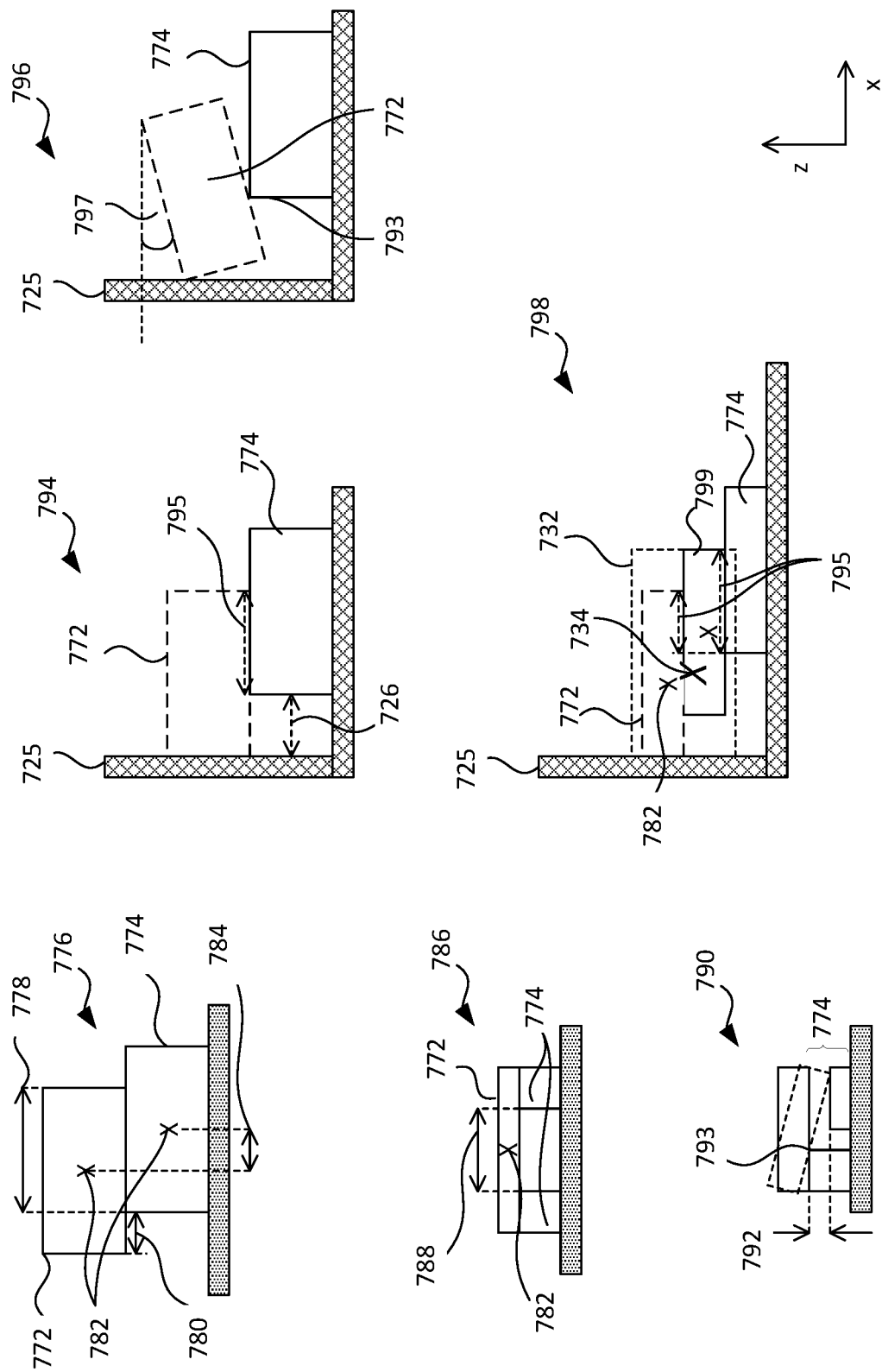
FIG. 7C is an illustration of placement rules in accordance with one or more embodiments of the present technology.

FIG. 7C is an illustration of example placement rules in accordance with one or more embodiments of the present technology. The robotic system 100 may use the placement rules to derive placement locations of objects within the designated container. For example, the robotic system 100 may discard or disqualify potential placement locations that fail to satisfy one or more placement rules.

Some instances of the placement rules can be for placing objects on top of each other, such as for stacking/placing one or more layers of packages above one or more other layer(s) of packages. The robotic system 100 can use the placement rules for improving/ensuring stability of the stacked objects and prevent any objects from slipping and/or tipping during movement of the container. For illustrative purposes, FIG. 7C show multiple scenarios of a top package 772 directly above and supported by (e.g., directly contacting) one or more support packages 774.

The robotic system 100 may use a horizontal offset rule 776 to derive 3D placement locations (e.g., the 3D packing plan 700 of FIG. 7A). The horizontal offset rule 776 can include a regulation, a requirement, or a combination thereof for controlling horizontal offsets of vertical edges/surfaces between stacked items. For example, the horizontal offset rule 776 can be based on an overlap requirement 778, an overhang requirement 780, or a combination thereof. The overlap requirement 778 can include a minimum amount (e.g., a percentage or a ratio of length, width, and/or surface area) of overlap between the stacked packages. In some embodiments, the overlap requirement 778 can require that a minimum amount of horizontal dimension/surface area of the top package 772 is overlapped with and/or contacting that of the support package 774. The overhang requirement 780 can include a maximum amount (e.g., a percentage or a ratio of length, width, and/or surface area) of overhang, such as a portion of the top package 772 that horizontally extends past a perimeter edge/surface of the support package 774.

In some embodiments, the horizontal offset rule 776 can be based on weight, dimension, and/or center-of-mass (CoM) locations 782. For example, the overlap requirement 778 and/or the overhang requirement 780 can be based on the CoM locations 782, such as for evaluating a distance between the CoM locations 782 of the top package 772 and the support package 774 relative to a distance between the top CoM location and a horizontal edge/surface of the support package 774. Also, the overlap requirement 778 and/or the overhang requirement 780 can correspond to evaluation of distance between the CoM locations 782 of the top package 772 and the support package 774 relative to an overhang distance (e.g., a measure along a horizontal direction of a portion of the top package 772 extending past peripheral edge(s) of the support package 774). In some embodiments, the horizontal offset rule 776 can be based on a CoM offset requirement 784 that requires the CoM locations 782 of the top packages 772 and the support packages 774 to be within a CoM support threshold. The CoM support threshold can include a predetermined distance, a threshold limit for a ratio between the offset distance between the CoM locations 782 relative to a horizontal dimension, an overhang distance, an overlapped distance, or a combination thereof.

The robotic system 100 may also use a support separation rule 786 to derive the 3D placement locations. The support separation rule 786 can include a regulation, a requirement, or a combination thereof for controlling a lateral separation distance 788 between the support packages 774. The lateral separation distance 788 can correspond to a horizontal distance between peripheral surfaces/edges of directly adjacent support packages 774. In some embodiments, the support separation rule 786 can be further based on locations and/or amounts of overlapped surfaces between the top package 772 and the support packages 774. For example, the support separation rule 786 can require that the lateral separation distance 788 be larger than any overhang distances by a predetermined percentage. Also, the support separation rule 786 can require that the lateral separation distance 788 extends under the CoM location 782 of the top package 772. In some embodiments, when the placement location of the top package 772 satisfies the support separation rule 786, the robotic system 100 may consider portions of the top package 772 between the support packages 774 (e.g., portions over the lateral separation distance 788) as being supported by and/or contacting an object in the bottom layer.

The robotic system 100 may also use a vertical offset rule 790 to derive 3D placement locations. The vertical offset rule 790 can include a regulation, a requirement, or a combination thereof for controlling a support height difference 792 between vertical locations of the support packages 774. The support height difference 792 can correspond to a vertical distance between top portions of corresponding support packages 774, such as for portions that would likely contact the top package 772 placed over the corresponding support packages 774. In some embodiments, the vertical offset rule 790 can require the support height difference 792 to be under a predetermined threshold requirement for stacking one or more packages on top of the support packages 774.

In some embodiments, the vertical offset rule 790 can vary based on the layer height. For example, when the top package 772 (e.g., the supported package) is part of the top-most layer, the limit for the support height difference 792 can be greater than for the lower layers. In some embodiments, the vertical offset rule 790 can vary based on proximity to vertically-oriented walls/dividers of the designated container. For example, when the support package 774 having the lower height is closest to the vertical wall (e.g., with no other objects between the support package 774 and the wall), the limit for the support height difference 792 can be greater since the top package 772 may be supported by the vertical wall even if the support fails and/or the top package 772 shifts.

The robotic system 100 may derive/estimate a pivot location 793 associated with an orientation of the top package 772 (e.g., tilt below a lateral/horizontal reference plane). The pivot location 793 can be a top portion of the taller support package (i.e., tallest support location). The robotic system 100 can derive the pivot location 793 as a peripheral edge and/or the highest portion of the support package nearest to the shorter support package. The robotic system 100 can further derive the pivot location 793 based on the CoM location 782, the lateral dimensions of the top package 772, and/or a weight of the top package 772. Similarly, the robotic system 100 can estimate a rotation of the top package 772 about the pivot location 793. The robotic system 100 may estimate the rotation according to the object reference location 728 (e.g., the CoM location 782), the lateral dimensions of the top package 772, and/or a weight of the top package 772.

The robotic system 100 can generate packing plans (e.g., a 3D combination of multiple 2D placement plans/locations) according to the placement rules. For example, the robotic system 100 can generate the 2D placement plans (e.g., placement locations along a lateral layer/plane) according to height requirements (e.g., for keeping the heights of the object groupings within a threshold distance). Subsequently, the robotic system 100 can generate the stacking plans based on vertically overlapping (e.g., stacking) the 2D placement plans.

The robotic system 100 can further generate the packing plans according to placement rules for leaning objects against the support wall 725. In some embodiments, the placement rules can include a wall-support rule 794, a tilt-support rule 796, and/or multiple overhang rule 798. The wall-support rule 794 can include a regulation, a requirement, or a combination thereof for controlling placement of objects against/contacting a vertically-oriented container structure. In one or more embodiments, the wall-support rule 794 may be analyzed first and other rules (e.g., the tilt-support rule 796 and/or the multiple overhang rule 798) may be analyzed or checked when the proposed/analyzed placement position satisfies the wall-support rule 794.

The wall-support rule 794 may be based on an effective support 795 that corresponds to a portion of the top package 772 (e.g., a portion of a bottom surface thereof) that would contact and/or be supported by the support package 774 when the top package 772 is placed on the support package 774. In other words, the effective support 795 may correspond to overlapping portions between the support package 774 and the top package 772 and/or a portion of the top package 772 excluding/remaining from the overhanging portion thereof. In some embodiments, the wall-support rule 794 may require a minimum amount (e.g., a minimum percentage threshold, such as 51% or greater) of the effective support 795. In other words, the wall-support rule 794 can require an overhang distance to be less than the effective support 795 by a prescribed amount. In one or more embodiments, the wall-support rule 794 may require a minimum number of corners (e.g., 4 to 6 corners out of 8 corners in a box-type structure) to be over/supported by the support package 774.

The wall-support rule 794 may also be based on the object-wall separation 726 measured between the support wall 725 and the support package 774, one or more dimensions of the top package 772, and/or the CoM location 782 of the top package 772. For example, the wall-support rule 794 may require the CoM location 782 to be over or within peripheral edges of the effective support 795 such that the CoM location 782 is over and/or supported by the support package 774. Also, the wall-support rule 794 may require the object-wall separation 726 to be less than a lateral dimension of the effective support 795 (e.g., remaining/ overlapped portion of the top package 772). The wall-support rule 794 may consider similar aspects as the horizontal offset rule 776, but with lowered support requirements based on contact with and/or the support provided by the support wall 725 for the top package 772. In other words, the robotic system 100 can derive, analyze, and/or validate potential placement locations that violate the horizontal offset rule 776 but satisfy the wall-support rule 794. For example, the wall-support rule 794 can derive and validate potential placement locations that overhang further along a lateral direction than allowed by the horizontal offset rule 776. Since the object placed at the placement location would contact the support wall 725 and derive structural support/stability from the container, the object may be placed at locations that would otherwise violate the horizontal offset rule 776.

The tilt-support rule 796 can include a regulation, a requirement, or a combination thereof for controlling placement of objects according to a tilt or a change in pose of the top package 772 with respect to contact between the top package 772 and the support wall 725. In some embodiments, the tilt-support rule 796 can be applied/tested when the top package 772 is adjacent to the support wall 725 without contact (e.g., having a non-zero separation distance along a lateral direction between an outermost edge of the top package 772 and the support wall 725). The tilt-support rule 796 can be used to account for shifts and/or rotations of the top package 772 that may occur during transport and resulting effect on other objects within the container.

In some embodiments, the tilt-support rule 796 may place a limit (e.g., a maximum threshold) for a tilt angle 797 associated with the top package 772. The tilt angle 797 can be an angle between a reference surface (e.g., a top surface) of the top package 772 in an intended pose or at a candidate placement location and in a rotated pose. The robotic system 100 can calculate the tilt angle 797 based on rotating the corresponding discretized model of the top package 772 about the pivot location 793 (e.g., a peripheral edge of the support package 774 nearest to the support wall 725). The tilt angle 797 can correspond to a peripheral portion of the top package 772 (e.g., a top portion nearest to the support wall 725) contacting the support wall 725. Accordingly, the tilt-support rule 796 may be used to validate the placement location that would cause the top package 772 to contact and/or be supported by the support wall 725 without excessive rotation of the top package 772 (i.e. an amount of rotation that would cause the support package 774 to shift in position and/or cause the top package 772 to topple/fall into the object-wall separation 726). The robotic system 100 can use the tilt-support rule 796 to derive, analyze, and/or validate potential placement locations that may violate other rules, such as the horizontal offset rule 776 and/or the wall-support rule 794. In other words, based on the tilt-support rule 796, the robotic system 100 can validate positions where the object would extend/overhang further than allowed by the horizontal offset rule 776 since the object would remain supported/fixed even in the event that the object shifts during transport.

In one or more embodiments, the tilt-support rule 796 may further be based on the weight of the top package 772 and/or the CoM location 782 of the top package 772 relative to the pivot location 793. For example, the robotic system 100 can calculate an object-shift likelihood (e.g., a likelihood of lateral displacement during transfer) for the top package 772 based on the weight thereof. Also, the robotic system 100 can calculate an object-rotation likelihood for the top package 772 based on the weight and the CoM location 782 of the top package 772 relative to the pivot location 793. The robotic system 100 may calculate the various likelihoods according to one or more predetermined equations/processes that account for forces encountered by the objects during transfer, friction forces between placed objects and/or container, and/or other associated physical parameters. The robotic system 100 may include qualifying threshold(s) for the various likelihoods. In other words, the robotic system 100 may conclude that the targeted placement position satisfies the tilt-support rule 796 when the calculated shift/rotation likelihoods are below the qualifying thresholds with or without considering the tilt angle 797.

The multiple overhang rule 798 can include a regulation, a requirement, or a combination thereof for controlling placement of multiple/successive overhanging objects. In other words, the multiple overhang rule 798 can be used to evaluate a candidate placement location over and supported by an intermediate object 799 that is over and supported by the support package 774. The robotic system 100 may consider the multiple overhang rule 798 when the candidate placement location is over the intermediate object 799 overhanging one or more objects below with peripheral portions of the intermediate object 799 laterally extending past peripheral portions of one or more objects below. In other instances (e.g., when peripheral portions of the intermediate object 799 extends laterally up to and not beyond peripheral portions of objects below), the robotic system 100 may consider the candidate placement location relative to intermediate object 799, such as by considering the intermediate object 799 as the support object.

In processing the multiple overhang rule 798, the robotic system 100 can derive the effective support 795 of the top package 772 relative to one or more packages below the intermediate overhanging object 799. For example, the robotic system 100 can derive the effective support 795 based on overlap between the top package 772 and the bottom-most package and/or the package that is furthest away laterally from the support wall 725. In other words, the robotic system 100 may designate the bottom-most object or the object that is laterally the furthest from the support wall 725 as the support package 774 for objects above, including the top package 772. In some embodiments, as part of processing for the multiple overhang rule 798, the robotic system 100 can use the resulting effective support 795 for the top package 772 to test for the horizontal offset rule 776 and/or the wall-support rule 794. The robotic system 100 can validate the candidate placement location and determine the multiple overhang rule 798 as being satisfied when the adjusted effective support 795 of the top package 772 satisfies the horizontal offset rule 776 and/or the wall-support rule 794 as described above.

Alternatively or additionally, the robotic system 100 can derive a combined object estimation 732 with a combined reference location 734 for the objects above the designated support package 774 (e.g., the bottom-most object and/or the object below the candidate placement location and laterally furthest from the support wall 725), including the candidate placement location of the top package 772. The robotic system 100 can derive the combined object estimation 732 as a designated planar shape (e.g., a rectangle) that encompasses and/or is coincident with outer-most portions of the combined objects (e.g., objects above and/or supported by the designated support package 774). In other words, the robotic system 100 can derive the combined object estimation 732 similar to the AABB 730 but for the combined objects. The robotic system 100 can derive the combined reference location 734 based on combining the reference locations (e.g., the CoM locations) of the combined objects. For example, the robotic system 100 can derive the combined reference location 734 based on combining (via, e.g., spatial averaging) the CoM locations 782 with the corresponding package weights as parameter weights for the CoM locations 782. Accordingly, the robotic system 100 can estimate and process a CoM location for the combined set of objects.

To test for compliance with the multiple overhang rule 798, the robotic system 100 can process/test the combined object estimation 732 and/or the combined reference location 734 in place of the top package 772 and/or the corresponding CoM location 782. For example, the robotic system 100 can validate the candidate placement location when the corresponding combined object estimation 732 and/or the combined reference location 734 satisfy the horizontal offset rule 776, the wall-support rule 794, the tilt-support rule 796, and/or any other placement rules.

In some embodiments, the robotic system 100 may compare the object-wall separation 726 to a support threshold distance that represents a limit for supporting the top package 772. The support threshold distance may be based on one or more physical aspects of the top package 772 (e.g., package height). For example, the support threshold distance can be for determining whether the object-wall separation 726 is large enough for the top package 772 to laterally shift and fall between the support wall 725 and the support package 774. Accordingly, the horizontal offset rule 776, the wall-support rule 794, the tilt-support rule 796, and/or other placement rules may require the object-wall separation 726 to be below the support threshold distance (e.g., a fraction of a dimension of the top package). In one or more embodiments, the robotic system 100 may adjust the threshold requirements for the effective support 795 based on the relationship between the object-wall separation 726 and the support threshold distance. For example, the robotic system 100 may increase the threshold requirement for the effective support 795 (e.g., from between 51% and 60% to 75% or greater) when the object-wall separation 726 is greater than the support threshold distance.

In some embodiments, the robotic system 100 can consider and validate the candidate placement locations with the top package 772 extending above a top edge of the support wall 725. The robotic system 100 may validate such placement locations based on, for example, (1) an overlap amount between the support wall 725 and top package 772, (2) a protrusion amount for the portions of the top package 772 protruding above the top edge, (3) a ratio between (1) and (2), (4) the CoM location 782 of the top package 772 (e.g., vertical location of the CoM relative to the wall edge), (5) a lateral distance between the top package 772 and the support wall 725, (6) the pivot location, (7) estimated or predetermined friction coefficients for the placed objects, (8) weight of the objects, (9) maximum acceleration/force thresholds associated with shifting/toppling objects, and/or other similar physical parameters.

The robotic system 100 may process the various placement rules according to one or more predetermined sequences and/or interaction patterns. For example, the robotic system 100 may test the candidate placement location according to a predetermined sequence and/or flow (e.g., if-then type of processing) associated with the placement rules. Also, the robotic system 100 may process a score corresponding to each placement rule, aggregate the resulting scores, and compare the aggregate score to a placement score threshold to validate the candidate placement location.

Example 3D Computations

Figures 8A, 8B:
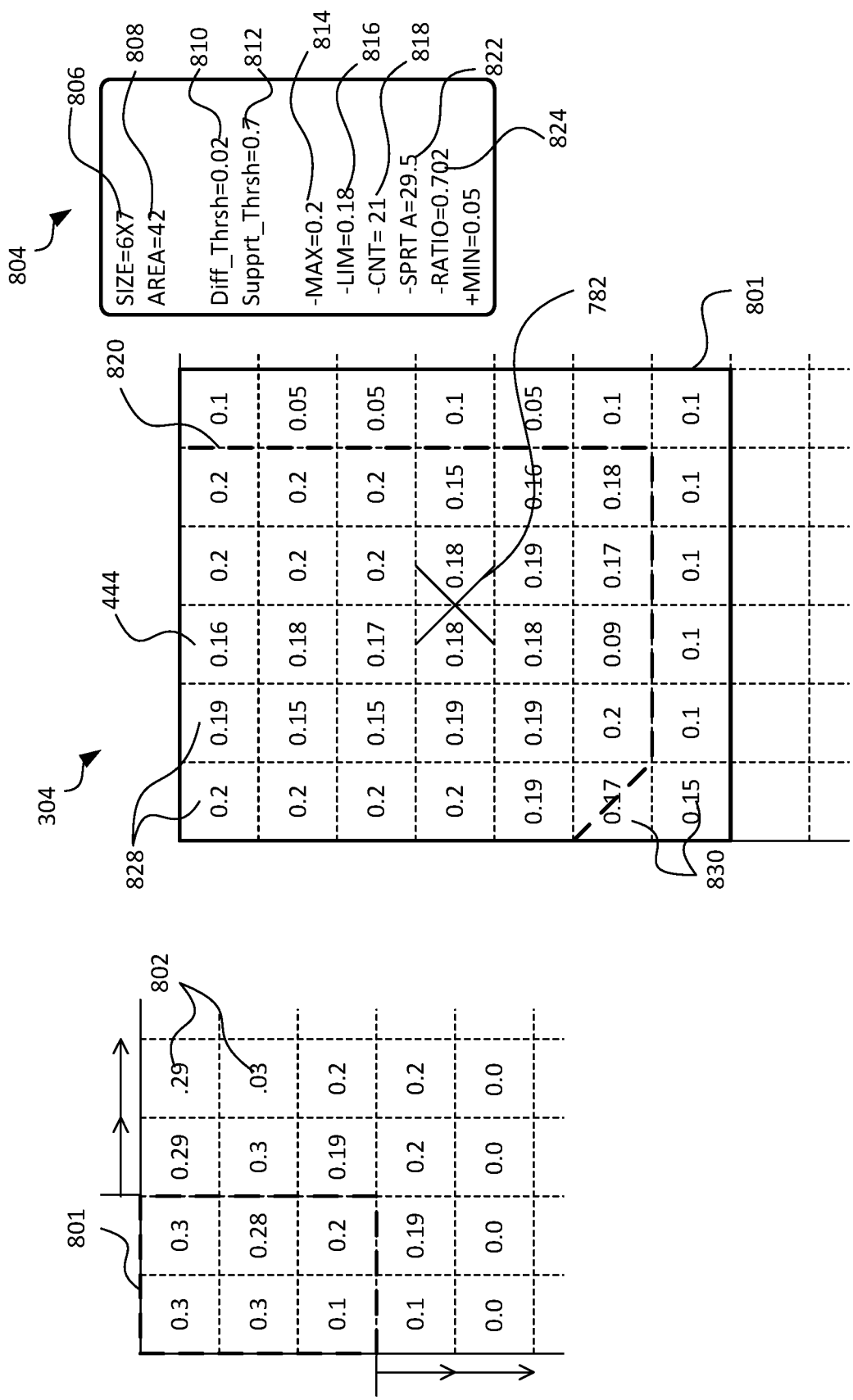
FIGS. 8A and 8B are illustrations of various aspects of a support computation in accordance with one or more embodiments of the present technology.

FIGS. 8A and 8B are illustrations of various aspects of a support computation in accordance with one or more embodiments of the present technology. As described above, the robotic system 100 of FIG. 1 can derive the packing plan 700 of FIG. 7A based on deriving and testing candidate placement locations for the target object 112 of FIG. 1. The candidate placement location can represent a node in the search tree 754 of FIG. 7B. FIGS. 8A and 8B may illustrate an example mechanism for computing 3D placements of objects (e.g., stacking objects), which may be performed at least partially off-line (using, e.g., expected or known parameters) and/or at least partially in real-time (based on, e.g., real-time sensor data).

In some embodiments, the robotic system 100 can iteratively move the discretized model of the target object (e.g., the object footprint model 612 of FIG. 6) across the discretized model of the designated placement container (e.g., the container footprint model 622 of FIG. 6) to generate the candidate positions. For example, the robotic system 100 can generate an initial instance of a candidate position 801 by placing a corresponding discretized object model according to one or more orientations at a predetermined initial location (e.g., a corner) of the discretized platform model. For the next instance of the candidate position 801, the robotic system 100 can move the discretized object model by a predetermined distance (e.g., one or more unit pixels) according to a predetermined direction/pattern.

When the candidate position 801 overlaps one or more objects at a planned location or an existing object/structure (such as for real-time placement computations), the robotic system 100 can calculate and evaluate a measure of support (e.g., effective support 795 of FIG. 7C) provided by the already-placed objects. To calculate and evaluate the measure of support, the robotic system 100 can determine and track heights/contour for the placement area. For example, the robotic system 100 can update height measures 802 per a unit area (e.g., the discretized units 602 of FIG. 6) according to known/expected heights of processed objects (e.g., objects with finalized or validated placement locations). For real-time processing, the robotic system 100 can use depth measures (e.g., point cloud values) from one or more of the imaging devices 222 of FIG. 2 directed toward the task location 116 of FIG. 1. Since a vertical position of the ground and/or the platform surface is known (e.g., a height of the cart/cage-base above the facility ground surface), the robotic system 100 can use the depth measure to calculate the heights/contour of the exposed top surface(s) of the platform, the placed objects, or a combination thereof.

The robotic system 100 can update the discretized platform model to include the height measures 802 during the iterative placement derivation. The robotic system 100 can determine the height measures 802 according to each of the discretized pixels in the discretized platform model. For example, the robotic system 100 can determine the height measures 802 as the maximum heights for the surface portions of the container base and/or placed/processed objects within the corresponding unit pixels.

For each of the candidate positions 801 that overlap one or more of the already-placed objects, the robotic system 100 can evaluate the placement possibility based on the height measures 802. In some embodiments, the robotic system 100 can evaluate the placement possibility based on identifying the highest value of the height measures 802 overlapped in each of the candidate positions 801. The robotic system 100 can further identify other height measures 802 located in each of the candidate positions 801 with the height measures 802 within a limit of a difference threshold relative to the highest measure of the height measures 802. The qualifying cells/pixels can represent locations that can provide support for the stacked object such that the stacked object rests essentially flat/horizontal (i.e. parallel relative to the placement surface of the container base).

As illustrated in FIG. 8A, for the first of the candidate positions 801 (e.g., upper-left corner of the container footprint model 622), the highest height measure can be 0.3 (i.e., 300 millimeters (mm) tall). For the difference threshold predetermined as 0.02 (representing, e.g., 20 mm), the robotic system 100 can identify the top four discretized cells/pixels as satisfying the difference threshold. The robotic system 100 can use the identified/qualifying cells/pixels to evaluate/represent the degree of support.

FIG. 8B illustrates a further example of the support computation. FIG. 8B shows one of the candidate positions 801 with the container footprint model 622 (shown using solid thicker outline) overlaid in an upper-left corner of the candidate positions 801. The robotic system 100 can calculate/utilize various support parameters 804, which are parameters used to evaluate the candidate position 801. For example, the support parameters 804 can include discretized dimensions 806, an overlapped area 808, a height difference threshold 810, a support threshold 812, a maximum height 814, a lower height limit 816, a qualifying count 818, a set of support area outlines 820, a support area size 822, a support ratio 824, the CoM location 782, or a combination thereof.

The discretized dimensions 806 can describe physical dimensions (e.g., length, width, height, circumference, etc.) of the target object 112 of FIG. 1 according to the discretization units 602 of FIG. 6. For example, the discretized dimensions 806 can include quantities of the discretization units 602 that form peripheral edges of the discretized object model 612/614. The overlapped area 808 can describe an area (e.g., a footprint size along the horizontal plane) occupied by the target object 112, which can similarly be represented according to the discretization units 602. In other words, the overlapped area 808 can correspond to a quantity of the discretization units 602 within the discretized object model. For the example illustrated in FIG. 8B, the target object 112 can have the discretized dimension 806 of six pixels by seven pixels, which corresponds to the overlapped area 808 of 42 pixels.

The height difference threshold 810 and the support threshold 812 can correspond to limits used to process and/or validate the candidate positions 801. The height difference threshold 810, which can be predetermined and/or adjusted by an operator and/or an order, can represent allowed deviations from another reference height (e.g., the maximum height 814 corresponding to the highest instance of the height measures 802 in the area overlapped by the discretized object model) for contacting and/or supporting packages placed on top. In other words, the height difference threshold 810 can be used to define a range of surface heights that can contact and/or support the package placed thereon. As such, relative to the maximum height 814, the lower height limit 816 can correspond to a lower limit for heights within the overlapped area 808 that can provide support for the stacked package. For the example illustrated in FIG. 8B, the height difference threshold 810 can be 0.02. When the maximum height 814 is 0.2, the lower height limit 816 can be 0.18. Accordingly, in placing the target object 112 at the candidate position 801, the robotic system 100 can estimate that surfaces/pixels with heights greater than 0.18 will contact and/or provide support for the target object 112.

Accordingly, in one or more embodiments, the robotic system 100 can categorize the discretization units 602 within the overlapped area 808 according to the height difference threshold 810. For example, the robotic system 100 can categorize the discretization units 602 having heights satisfying the height difference threshold 810 (i.e., values greater than or equal to the lower height limit 816) as supporting locations 828 (e.g., a grouping of discretization units 602 that represent a surface capable of having objects stacked thereon, such as represented in FIG. 4B via shaded pixels). The robotic system 100 can categorize the other discretization units 602 as unqualified locations 830 (e.g., pixels with heights lower than the lower height limit 816).

The support threshold 812 can represent a limit for evaluating the candidate positions 801 based on a sufficiency of the supporting locations 828. For example, the support threshold 812 can be for evaluating an amount, a ratio, an area, a location, or a combination thereof associated with the supporting locations 828. In some embodiments, the support threshold 812 can be used to determine whether the qualifying count 818 (e.g., an amount of the supporting locations 828) for the candidate position 801 is sufficient for supporting the target object 112.

In one or more embodiments, the support threshold 812 can be used to evaluate a supported area (e.g., the discretization units 602 that can provide support to an object stacked thereon, as can be determined by the height threshold) associated with the supporting locations 828. For example, the robotic system 100 can determine the support area outlines 820 based on extending edges and/or determining lines that extend across or around the unqualified locations 830 to connect corners of outermost/perimeter instances of the supporting locations 828. Thus, the support area outlines 820 can exclude the unqualified locations 830. Accordingly, the support area outlines 820 can define a perimeter for the supported area based on the perimeter instances of the supporting locations 828. Since the support area outlines 820 can extend across and/or include the unqualified locations 830, the support area size 822 (e.g., a quantity of the discretization units 602 within the supported area) can be greater than the qualifying count 818. As such, the support area size 822 effectively represents separations between the outermost edges/corners where the support is provided. Because wider supports are preferred (e.g., wherein portions of the support area outlines 820 are greater than the overlap area 808 of the object for reducing overhangs and/or improving stability), the support threshold 812 can correspond to a minimum number of the discretization units 602 in the supported area (e.g., for evaluating the support area outlines 820), thereby effectively evaluating a separation between the outermost edges/corners where the support is provided.

In some embodiments, the support threshold 812 can be for evaluating the support ratio 824, which can be calculated based on comparing the qualifying count 818 and/or the support area size 822 to the overlapped area 808. For example, the support ratio 824 can include a ratio between the qualifying count 818 and the overlapped area 808 for representing horizontal stability, supported weight concentration, or a combination thereof. Also, the support ratio 824 can include a ratio between the support area size 822 and the overlapped area 808 for representing relative widths between supporting edges/corners under the target object 112.

Further, the robotic system 100 can further evaluate the candidate positions 801 based on the CoM location 782 of the target object 112. In some embodiments, the robotic system 100 can access the CoM location 782 of the target object 112 from the master data 252 of FIG. 2 and/or dynamically estimate the CoM location 782 based on gripping and/or lifting the target object 112. Once accessed/estimated, the robotic system 100 can compare the CoM location 782 to the support area outlines 820. The robotic system 100 can require the candidate position 801 to include the CoM location 782 within the support area outlines 820 and eliminate/disqualify the candidate positions 801 that fail to satisfy such requirement. In one or more embodiments, the robotic system 100 can calculate and evaluate a placement score based on separation distances (e.g., along the x and/or the y axes) between the CoM location 782 and the support area outlines 820.

The robotic system 100 can use the support parameters 804 to evaluate constraints/requirements. For example, the robotic system 100 can eliminate/disqualify the candidate positions that do not satisfy the support threshold 812, a CoM location threshold (e.g., a requirement to include the CoM location 782 within the support area outlines 820), and/or other stacking rules. Also, the robotic system 100 can use the support parameters 804 to calculate the placement scores for the candidate positions 801 (e.g., the locations that satisfy the constraints) according to predetermined weights and/or equations. As described in detail below, the robotic system 100 can use the calculated placement score to rank the candidate positions 801 according to the predetermined preferences (e.g., as reflected by the weights/equations).

In some embodiments, the robotic system 100 can determine whether the end-effector 304 of FIG. 3 can be positioned to place the target object 112. For example, the robotic system 100 can overlap the discretized end-effector model (e.g., the gripper footprint model 632 of FIG. 6 and/or the gripper profile model 634 of FIG. 6) over the discretized platform model (e.g., the container footprint model 622 and/or the container profile model 624) at the task location 116 of FIG. 1, according to the derived candidate positions 801. The robotic system 100 may verify the candidate positions 801 when the discretized end-effector model is between (e.g., without overlapping) the support wall 725 of FIG. 7C or corresponding discretized portions.

As an illustrative example, the robotic system 100 can verify a set of available grip configuration of the end-effector 304 (e.g., over a center portion, aligned against a peripheral edge, rotated 1-359 degrees relative to the object, etc.) for one or more (e.g., each) of the candidate positions 801. For each grip configuration, the robotic system 100 can adjust the discretized end-effector model according to the grip configuration and overlay the adjusted model over the discretized platform model. Using the overlaid models, the robotic system 100 can calculate depth values for the end-effector 304 at the placement position of the target object 112 (i.e., with the target object 112 resting on the placement surface in the candidate position 801). The depth value(s) for a top surface of the target object 112 in the candidate position 801 can be calculated as the sum of the depth value of the placement surface according to the discretized platform model, height of one or more objects placed or planned for placement between the container floor and the candidate position 801, and/or the height of the target object 112. The corresponding depth value(s) for the end-effector can be calculated as the sum of the calculated depth value of top surface of the target object at the candidate position 801 and the depth value(s) corresponding to the discretized end-effector model.

For each grip configuration, the robotic system 100 can compare the depth values of the discretized end-effector model with the depth values surrounding the target object 112 in the candidate position 801 (e.g., heights of other objects and/or the support wall 725). The robotic system 100 can reject the grip configuration when the depth values for the discretized platform and/or objects thereon indicate that the 2D mesh for the discretized end-effector model will collide with portions of the container (e.g., the support wall 725) or objects stacked therein. The robotic system 100 can detect likely collisions when the depth values are the same or within a threshold range between the discretized platform model and the discretized end-effector model. The robotic system 100 may also detect the likely collisions when the depth values indicate that the discretized end-effector is lower than the corresponding/overlapping portions of the discretized platform model. Similarly, the robotic system 100 can determine potential collisions when the 2D mesh representing the end-effector and attached portion of the robotic arm contact or extend beyond the boundaries of the discretized platform model.

The robotic system 100 can accept or validate the grip configuration that pass the collision analysis. In other words, the robotic system 100 can validate the remaining grip configurations that do not correspond to any potential collisions. The robotic system 100 can further validate the corresponding candidate position 801 based on validating the grip configuration. Thus, the robotic system 100 can account for the end-effector 304 in deriving the placement of the target object 112. The robotic system 100 can further use the above-described process to account for the end-effector 304 when updating the placement plans in real-time to adjust for unexpected conditions (e.g., unexpected location and/or shape of the support wall 725).

Example Motion Planning

Figure 9B:
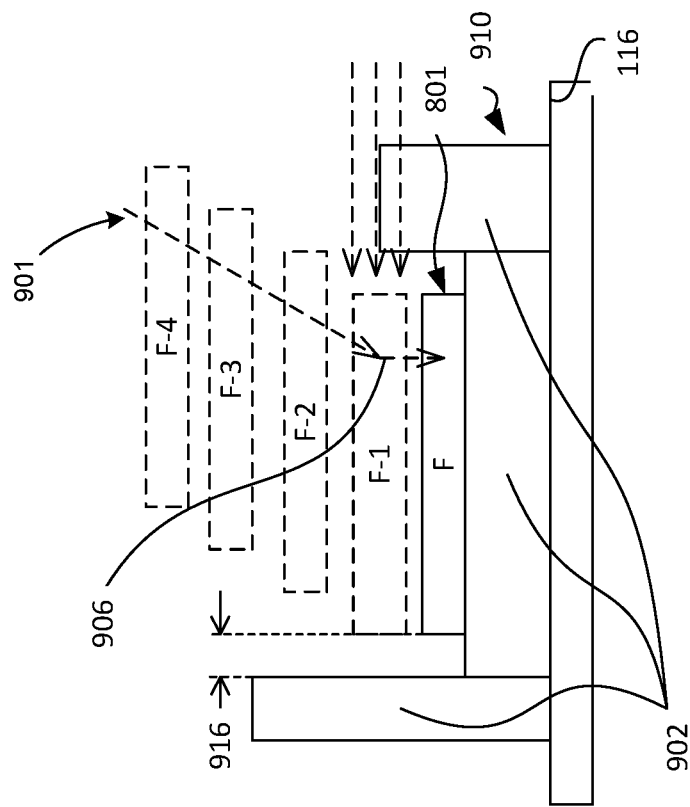
FIGS. 9A-9C are illustrated aspects of an example motion plan computation in accordance with one or more embodiments of the present technology.
Figure 9A:
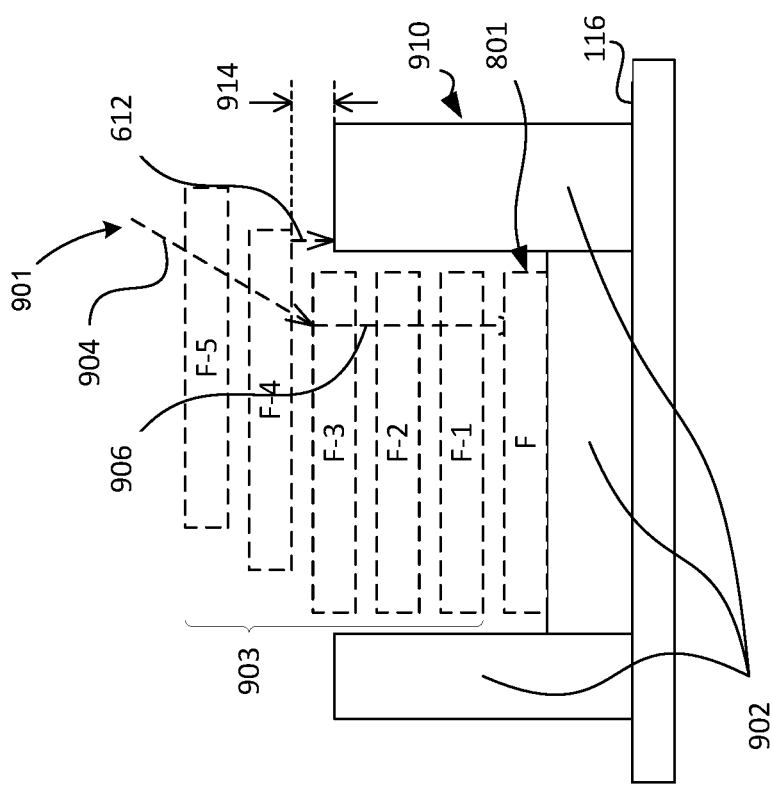
Figure 9C:
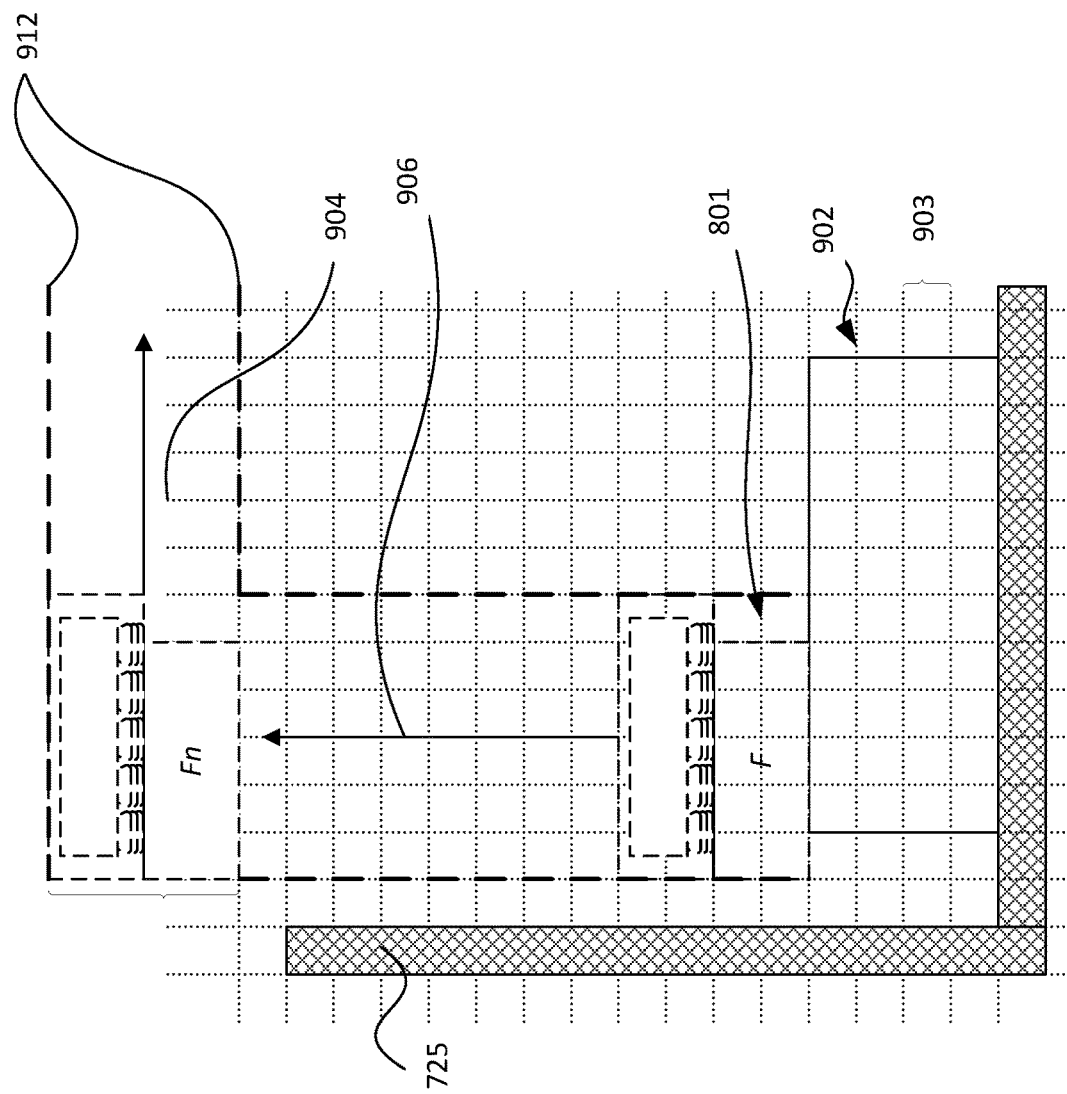

FIGS. 9A-9C are illustrated aspects of an example motion plan computation in accordance with one or more embodiments of the present technology. FIGS. 9A and 9B are profile views illustrating example approaches for placing the target object 112 of FIG. 1. FIGS. 6A and 6B each illustrate an approach path 901 for placing the target object 112 at the corresponding candidate position 801 of FIG. 8A over one or more preceding objects 508 (e.g., objects already placed or planned for earlier placement) in the container.

The robotic system 100 of FIG. 1 can derive the approach path 901 based on approach increments 903, which are illustrated as the dashed boxes of F-1 to F-5. The approach increments 903 can represent sampling increments that correspond to sequential positions of the target object 112, the robotic arm 302 of FIG. 3 (or a portion thereof), the end-effector 304 of FIG. 3, or a combination thereof, in 3D space along the corresponding approach path 901. In some embodiments, the approach increments 903 can match one or more dimensions of the discretization units 602 of FIG. 6 used for the models. The approach path 901 can include path segments 904 that correspond to linear segments/directions. The path segments 904 may include a final segment 906 for placing the target object 112 at the corresponding candidate position 801 of FIG. 8A. In some embodiments, the final segment 906 can include a vertical (e.g., a downward) direction or movement. In other embodiments, the final segment 906 can include an angled downward trajectory into the candidate position 801 following a vertical downward approach increment, such as to place the object beneath and/or laterally extending into an overhang.

To derive the approach path 901, the robotic system 100 can identify any of the preceding objects 902 and/or the support walls 725 that may potentially become an obstacle for the target object 112, the robotic arm 302, and/or the end-effector 304 when placing the target object 112 at the candidate position 801. In one or more embodiments, the robotic system 100 can identify potential obstacle(s) 910 as instance(s) of the preceding objects 902 overlapping a horizontal line (e.g., a straight line along the x-y plane) and/or a 2D plane extending between locations over the start location 114 and the corresponding candidate position 801. The robotic system 100 can further identify the potential obstacle(s) 910 as instance(s) of the preceding objects 902 overlapping a lane 912 (as illustrated in FIG. 9C) derived around the horizontal line, such as based on deriving the lane 912 parallel to and overlapping the horizontal line and having a width based on one or more dimensions (e.g., a width, a length, and/or a height) of the target object 112. As illustrated in FIGS. 9A and 9B, the start location 114 can be to the right of the candidate position 801. Similarly, the robotic system 100 can further identify the potential obstacle(s) 910 as the support walls 725 of the container.

In some embodiments, the robotic system 100 can validate the potential obstacle 910 based on the depth measures described above. For example, the robotic system 100 can validate/identify the potential obstacles 910 with one or more of the top surface depth measures greater than or equal to those of the candidate position 801. The robotic system 100 can eliminate from the potential obstacles 910 the preceding objects 902 that have the top surface depth measures less than those of the candidate position 801. In one or more embodiments, the robotic system 100 can identify/eliminate the potential obstacles 910 based on an ambiguity associated with the height of the candidate position 801 and/or the height of the potential obstacles 910.

In some embodiments, the robotic system 100 can derive the approach path 901 in a reverse order, such as beginning from the candidate position 801 and ending at the start location 114. Accordingly, the robotic system 100 can derive the final segment 906 first (e.g., before other segments) to avoid the potential obstacles 910. For example, the robotic system 100 can determine a set of the lanes 912 according to dimensions of the object and the end-effector (e.g., a combination of the gripper models and the object models according to the engaged interface height 534 of FIG. 5C). In some embodiments, the set of lanes can include one or more laterally-extending lanes that correspond to a height and/or a width of the target object. The set of lanes may also include one or more vertically-extending lanes that correspond to a length and/or a width of the target object.

The robotic system 100 can first derive the vertically-extending lanes extending upward from the candidate position 801. The robotic system 100 can evaluate whether the vertically-extending lanes overlap/contact any preceding objects 902 and/or the support walls 725. The robotic system 100 can disqualify the candidate position 801 based on detecting the overlap/contact and/or evaluate lateral movements. When the vertically-extending lanes do not overlap/contact any potential obstacles 910 (e.g., the preceding objects 902 and/or the support walls 725), the robotic system 100 can derive the laterally-extending lanes from the vertically-extending lanes to a location over the start location 114. The robotic system 100 can derive the laterally-extending lanes at a predetermined minimum height (e.g., minimum/maximum drop height and/or the container wall height).

The robotic system 100 can similarly evaluate whether the laterally-extending lanes overlap/contact any potential obstacles 910. The robotic system 100 can iteratively increase a height (e.g., by one or more approach increments 903) for the laterally-extending lanes based on detection of a potential obstacle. The robotic system 100 can thus evaluate lateral lanes at increasing heights until a clear approach lane is determined and/or a maximum evaluation height is reached. When the maximum evaluation height is reached without a clear lane, the robotic system 100 can disregard the candidate position 801. Otherwise, the robotic system 100 can validate the laterally-extending lane.

The robotic system 100 can derive the approach path 901 according to the validated vertical lanes (e.g., corresponding to the final segment 906) and the validated lateral lanes (e.g., corresponding to the path segment 904). In some embodiments, the robotic system 100 can similarly evaluate diagonally extending lanes (e.g., lanes that extend upward and across at an angle) and/or multiple lane segments (e.g., iteratively going up and then moving across to follow a step pattern) for the approach path 901.

As an illustrative example, the robotic system 100 can continue to increase the height of the laterally extending lanes until the bottom surface/lane edge is above the potential obstacles 910 and/or clears a nearest potential obstacle by a clearance threshold 914 (e.g., a requirement for a minimum vertical separation for the target object 112 above a highest point of the potential obstacles 910 to avoid contact or collision between the target object 112 and the potential obstacle 910). When the lanes satisfy the clearance threshold 914, the robotic system 100 may adjust the corresponding approach increment along a horizontal direction (e.g., toward the start location 114) by a predetermined distance. Accordingly, the robotic system 100 can derive the final segment 906 and/or the subsequent path segments 904 based on the candidate position 801 and the approach path 901.

Once derived, the robotic system 100 can use the approach path 901 to evaluate the corresponding candidate positions 801. In some embodiments, the robotic system 100 can calculate the placement score according to the approach path 901. For example, the robotic system 100 can calculate the placement score according to a preference (e.g., according to one or more weights that correspond to predetermined placement preferences) for a shorter length/distance for the final/vertical segment. In one or more embodiments, the robotic system 100 can include a constraint, such as a maximum limit, associated with the approach path 901 (e.g., for the final/vertical segment 906) used to eliminate or disqualify candidate positions 801.

In some embodiments, the robotic system 100 can further evaluate the corresponding candidate positions 801 according to other collision/obstruction related parameters. For example, the robotic system 100 can evaluate the candidate positions 801 according to horizontal separations 916 between the candidate positions 360 and one or more of the preceding objects 902. Each of the horizontal separations 916 can be a distance (e.g., a shortest distance) along a horizontal direction (e.g., x-y plane) between the corresponding candidate position 360 and an adjacent instance of the preceding objects 902. The robotic system 100 can calculate the placement scores for the candidate positions 360 based on the horizontal separation 916 similarly as described above for the approach path 901. Also, the robotic system 100 can eliminate or disqualify candidate positions 360 based on the horizontal separation 916, such as when the horizontal separation 916 fails a minimum requirement. Since the final segment 906 is generally the most difficult for object placement, validation of the approach path 901 beginning with the final segment 906 provides reduced processing time for validating the approach path 901.

Example Adjustments for Unexpected Conditions

Figure 10:
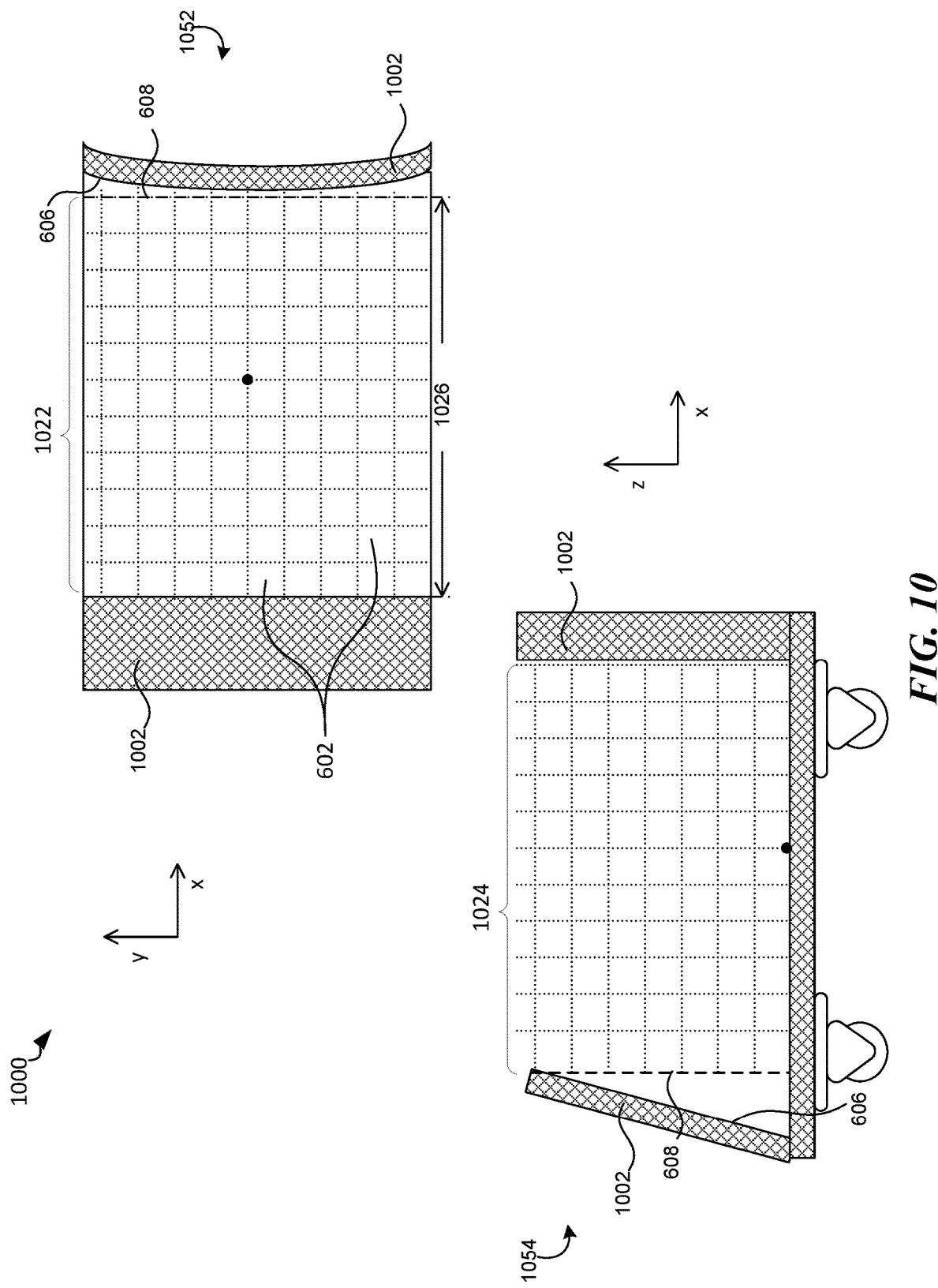
FIG. 10 illustrates example real-time sensor data in accordance with one or more embodiments of the present technology.

FIG. 10 illustrates example real-time sensor data (e.g., sensor output 1000) in accordance with one or more embodiments of the present technology. The robotic system 100 of FIG. 1 can obtain the sensor output 1000 via the corresponding sensors. For example, the sensor output 1000 may include a top-view image 1052 from the top-view sensor 310 of FIG. 3 and/or a side-view image 1054 from the side-view sensor 312 of FIG. 3. The top-view image 1052 and/or the side-view image 1054 can depict the container (e.g., the cart 410 of FIG. 4A and/or the cage 420 of FIG. 4C) at the task location 116 of FIG. 1 and/or the objects in the container.

The robotic system 100 of FIG. 1 can analyze the sensor output 1000 for unexpected features 1002 associated with the container. For example, the robotic system 100 can analyze the sensor output 1000 based on detecting the actual features 606 (via, e.g., an edge-detection mechanism, such as a Sobel filter) and comparing them to predetermined/expected features (e.g., edges) of the container. The robotic system 100 can detect the unexpected features 1002 when the actual features 606 depicted in the sensor output 1000 deviate from the expected features of the container (represented by, e.g., a corresponding template) and/or template patterns for predetermined error conditions. Some examples of the unexpected features 1002 can correspond to error conditions for the support wall 725 of FIG. 7C, such as a partially-opened cart wall (illustrated via the left wall) and/or a warped wall (illustrated via the right wall).

The unexpected features 1002 may correspond to a placement surface that deviates from an expected placement surface. For example, the partially-opened cart wall and/or the warped wall may expose a reduced portion of the container bottom surface. As such, the packing plans 700 of FIG. 7A derived based on expected conditions may not be applicable (e.g., may not fit without adjustments) for the actual container with the unexpected features 1002. Also, the unexpected features 1002 may present unexpected obstacles/blockages for motion plans (e.g., the approach paths 901 of FIG. 9A) associated with the packing plans 700.

Accordingly, in response to detecting the unexpected features 1002, the robotic system 100 may dynamically adjust the packing plans 700 to account for the unexpected features 1002. In other words, the robotic system 100 can dynamically (e.g., during packing/loading operation) generate or update the packing plans 700 to place the planned objects in the container despite or in view of the unexpected features 1002. In dynamically adjusting the packing plans 700, the robotic system 100 can use the sensor output 1000 to dynamically generate one or more actual container models that include or represent the unexpected features 1002. For example, the robotic system 100 can dynamically generate an adjusted footprint model 1022 based on the top-view image 1052 and/or an adjusted profile model 1024 based on the side-view image 1054. The robotic system 100 can generate the adjusted models based on pixelating and/or discretizing the sensor output 1000 according to the discretization units 602 of FIG. 6 and/or the approach increments 903 of FIG. 9A. For example, the robotic system 100 can identify detected edges that correspond to the support walls 725 (e.g., one or more inner top edges thereof) and/or the container base, based on predetermined patterns associated with depth, color, shape, and/or other parameters. The robotic system 100 can select one or more predetermined instances of the identified edges as starting/reference edges (e.g., a portion of the model boundary 608). The robotic system 100 can use the selected edges and begin dividing the area/space between the support walls 725 for the pixelization process. The robotic system 100 can pixelate the area/space without exceeding or extending past the edges that correspond to the support walls 725 and/or associated locations/heights. Thus, the robotic system 100 can determine remaining portions of the model boundary 608. Accordingly, the robotic system 100 can dynamically generate the adjusted models that represent an adjusted placement zone 1026 where the objects may be stored.

As described above, the robotic system 100 can dynamically determine the adjusted placement zone 1026 that may be different than the expected placement zone 430 of FIG. 4A. When the unexpected features 1002 are detected, the robotic system 100 can compare the adjusted placement zone 1026 to the expected placement zone 430 and/or the packing plan 700 for placing the objects in the container. For example, the robotic system 100 can overlay the container models and/or the packing plan 700 over the adjusted models. Accordingly, the robotic system 100 can determine whether the expected placement zone 430 differs from the adjusted placement zone 1026 and/or whether the packing plan 700 extends past the adjusted placement zone 1026.

The robotic system 100 can initiate pack relocation when the expected placement zone 430 differs from the adjusted placement zone 1026 and/or when the packing plan 700 or a portion thereof extends beyond the adjusted placement zone 1026. The robotic system 100 can implement the pack relocation based on moving the packing plan 700 within the adjusted placement zone 1026. For example, the robotic system 100 can initially align the AABB 730 of FIG. 7A to a predetermined corner/edge of the adjusted placement zone 1026 and evaluate whether the AABB 730 is contained within the adjusted placement zone 1026. When the initial alignment of the AABB 730 is not contained within the boundaries of the adjusted placement zone 1026, the robotic system 100 can iteratively shift the AABB 730 within the adjusted placement zone 1026 according to a predetermined pattern and evaluate whether the AABB 730 is contained within the adjusted placement zone 1026. Thus, the robotic system 100 may adjust placement locations of all objects within the packing plan 700 as a group/unit.

When a placement of the AABB 730 fits within the adjusted placement zone 1026, the robotic system 100 can validate the adjusted position of the packing plan 700. In some embodiments, the robotic system 100 can validate the adjusted position of the packing plan 700 based on evaluating whether the approach path 901 of FIG. 9A, for one or more objects in the shifted or adjusted instance of the packing plan 700, overlaps with the detected container edges. For example, the robotic system 100 can update the approach paths 901 of the first object, the first layer, objects on peripheral locations of the AABB 730, and/or other objects to account for the adjustment placement locations. The shifted approach paths 901 can be overlaid over and compared with the sensor output 1000 to determine whether the shifted approach paths 901 overlaps/collides with the container walls and/or preceding objects. When the evaluated approach paths are clear of the potential obstacles 910 of FIG. 9A for the unexpected features, the robotic system 100 can validate and implement the packing plan 700 according to the shifted location. Thus, the robotic system 100 can implement the packing plan 700 in light of the unexpected features 1002, such as without rederiving the packing plan 700 and/or the approach paths 901. When the robotic system 100 fails to determine an alternative location of the AABB 730 where all objects are contained within the adjusted placement zone 1026, the robotic system 100 may rederive the packing plan 700 and/or initiate/implement replacement of the container. Details regarding the dynamic adjustments to the unexpected features 1002 are described below.

Figure 11:
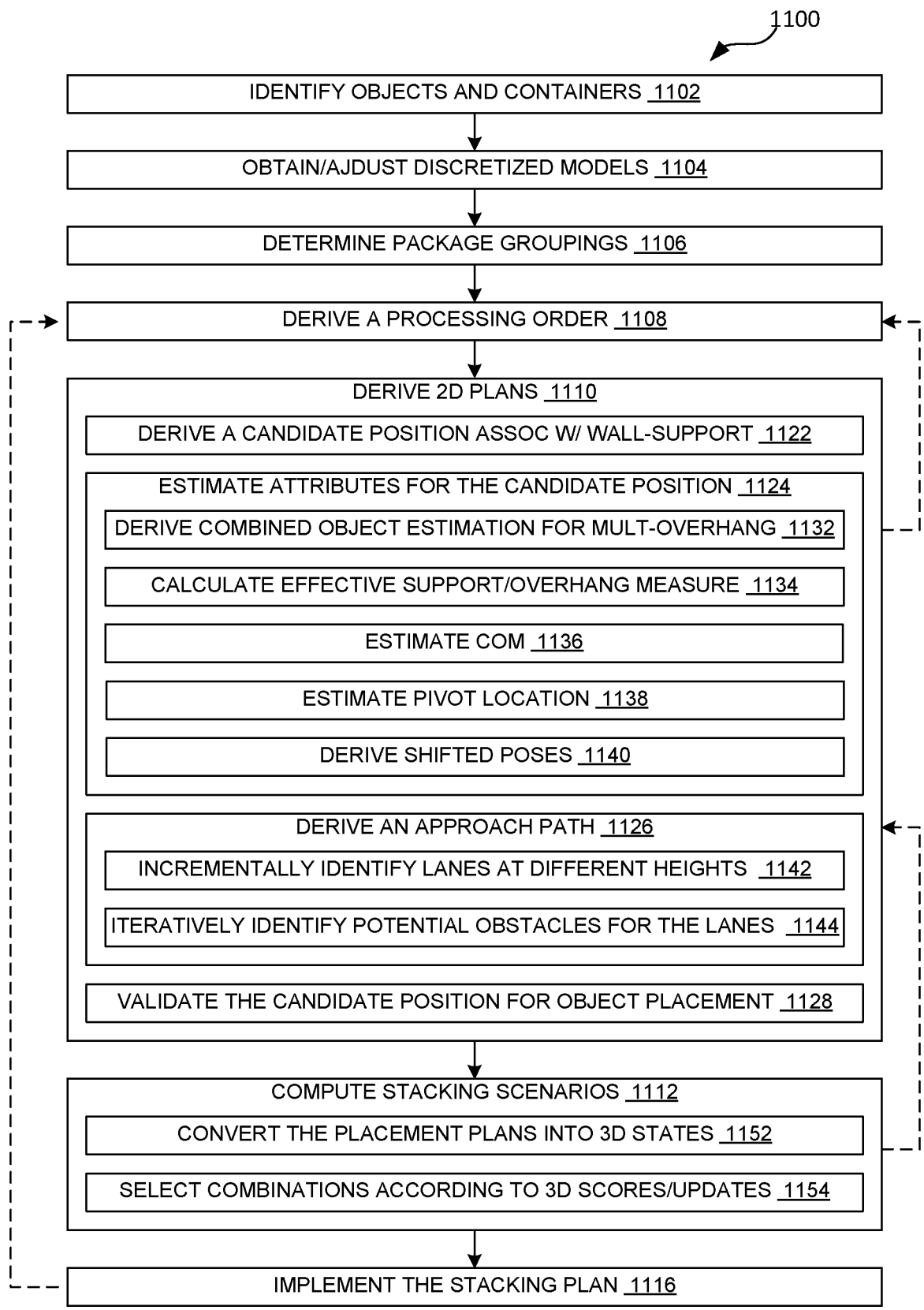
FIG. 11 is a flow diagram for a first example method of operating the robotic system of FIG. 1 in accordance with one or more embodiments of the present technology.

FIG. 11 is a flow diagram for a first example method 1100 of operating the robotic system 100 of FIG. 1 in accordance with one or more embodiments of the present technology. The method 1100 can be for deriving the packing plans 700 of FIG. 7A for placing objects (e.g., packages, cases, and/or boxes) into a container (e.g., the cart 410 of FIG. 4A and/or the cage 420 of FIG. 4C). The method 1100 can be implemented based on executing the instructions stored on one or more of the storage devices 204 of FIG. 2 with one or more of the processors 202 of FIG. 2. The processors 202 can control the robotic arm 302 of FIG. 3 and/or the end-effector 304 of FIG. 3 according to the packing plans 700, such as by transferring the target object 112 of FIG. 1 from the start location 114 of FIG. 1 to the container at the task location 116 of FIG. 1. For example, the processors 202 can control the robotic units to maneuver the components/objects along the approach paths 901 of FIG. 9A and place them at the corresponding placement locations in the container.

At block 1102, the robotic system 100 can identify a set of objects (e.g., objects that will be determined as the stacked object 724 of FIG. 7B, the top package 772 of FIG. 7C, the support packages 774 of FIG. 7C, the intermediate object 799 of FIG. 7C, etc.) designated for placement within containers at the task location 116. For example, the robotic system 100 can identify objects (e.g., the set of available packages 742 of FIG. 7B) that are available for packing, within an inbound shipment, arriving at a designated location, located at a source, designated for placement, and/or listed in an order/request/manifest.

Also, at block 1102, the robotic system 100 can identify the containers available to receive the identified objects. For example, the robotic system 100 can identify the carts 410 and/or the cages 420 that have empty or partially-filled status and/or available for access (e.g., currently not in use or not blocked). Also, the robotic system 100 can identify the containers that are becoming available, such as from a queue. The robotic system 100 may further determine characteristics/traits (e.g., categories, dimensions, identifiers, etc.) for the identified containers. The robotic system 100 can interface with another system (e.g., transport robot system), access information from the master data 252 of FIG. 2, and/or obtain real-time information from containers (via, e.g., sensors at predetermined locations) to identify the containers and/or their characteristics.

At block 1104, the robotic system 100 can obtain (e.g., by generating in real-time and/or accessing from the master data 252) one or more discretized models. For example, the robotic system 100 can obtain discretized models that represent the identified objects, such as the object models 706-710 of FIG. 7A, the corresponding footprint models 612 of FIG. 6, and/or the corresponding profile models 614, of FIG. 6. Also, the robotic system 100 can obtain discretized models that represent the identified containers, such as the container footprint models 622 of FIG. 6 and/or the container profile models 624 of FIG. 6.

In some embodiments, the robotic system 100 can generate the discretized models in real-time (e.g., such as after receiving the order and/or prior to beginning the packing operation, or offline) based on pixelating or dividing physical dimensions or images of the objects/containers according to the discretization units 602 of FIG. 6 (e.g., pixels having set dimensions). Dimensions of the discretization units 602 can be predetermined or dynamically set by a manufacturer, an ordering customer, and/or an operator. For example, the discretization units 602 may be 1 millimeters (mm) or ¹⁄₁₆ inches (in) or greater (e.g., at 5 mm or 20 mm). In some embodiments, the discretization units 602 can be based (e.g., a percentage or a fraction) on a dimension or a size of one or more of the objects and/or the containers.

In some embodiments, the robotic system 100 can access the discretized models stored in the storage devices 204 and/or another device (e.g., a storage device, a database, a system for controlling transport robots, and/or a server of a package supplier accessed via the communication devices 206 of FIG. 2). The robotic system 100 can access the predetermined discretized models that represents the identified objects and/or the identified containers. For example, the robotic system 100 can access the discretized object models corresponding to the identified objects by searching the master data 252 (e.g., a predetermined table or a lookup table) for the available objects and their corresponding models. Similarly, the robotic system 100 can access the discretized containers model representing the task location 116, such as the identified carts or cages, where the available objects are to be placed.

At block 1106, the robotic system 100 can determine object groupings (e.g., subgroupings of the identified objects). The robotic system 100 can determine the object groupings according to similarities and/or patterns in one or more characteristics of the identified objects. In some embodiments, the robotic system 100 can determine the object groupings according to predetermined grouping conditions/requirements, such as an object priority (e.g., as specified by one or more customers), a fragility rating (e.g., a maximum weight supportable by the object), a weight, a dimension (e.g., a height), a type, or a combination thereof. In grouping the objects, the robotic system 100 can search the master data 252 for the various characteristics of the identified objects that match the grouping conditions/requirements.

At block 1108, the robotic system 100 can derive a processing order (e.g., a sequence for considering/deriving placement locations) for the identified objects and/or the object groupings. In some embodiments, the robotic system 100 can derive the processing order according to one or more sequencing conditions/requirements. For example, the robotic system 100 can prioritize processing of the object groupings according to a number of objects within each of the groupings, such as for processing groupings with greater number of objects earlier in the placement planning. In some embodiments, the sequencing conditions can overlap with the grouping conditions, such as for the weight ranges, the fragility ratings, etc. For example, the robotic system 100 can prioritize the processing of the heavier and/or the less fragile objects for earlier processing and/or for placement in lower layers.

In some embodiments, the robotic system 100 can prioritize the placement planning according to a combined horizontal area. The robotic system 100 can calculate (e.g., via, e.g., multiplying corresponding widths and lengths) or access surface areas of top surfaces of the objects in the groupings using information specified in the master data 252. In calculating the combined horizontal area, the robotic system 100 can add the surface areas of objects having the same type and/or heights within a threshold range. In some embodiments, the robotic system 100 can prioritize the placement planning of groupings that have the larger combined horizontal area for earlier processing and/or for placement in lower layers.

For one or more embodiments, the robotic system 100 can load a buffer (e.g., the storage device 204) with identifiers and/or quantities of the identified objects. The robotic system 100 can sequence the identifiers in the buffer according to the groupings. Further, the robotic system 100 can sequence the identifiers in the buffer according to the processing order. Accordingly, the sequenced values in the buffer can correspond to the available packages 742 and/or the remaining packages 752 illustrated in FIG. 7B.

The robotic system 100 may derive the processing order for an initial set of the available packages 742 off-line, such as before any of the objects are placed on the platform. In some embodiments, the robotic system 100 can dynamically derive the processing order for a remaining set of the available or remaining packages 752 after initiating or while implementing the corresponding packing plan 700. For example, as illustrated by a feedback loop from block 1116, the robotic system 100 can calculate the processing order for the remaining set (e.g., a portion of the available or remaining packages 752 that have not been transferred to the platform and/or remain at a source location) according to one or more triggering conditions. Example triggering conditions can include stacking errors (e.g., lost or fallen objects), collision events, predetermined retriggering timings, container abnormalities (e.g., detection of the unexpected features 1004 of FIG. 10), or a combination thereof.

The robotic system 100 can derive the packing plan 700 based on iteratively deriving and evaluating the candidate positions 801 and/or combinations thereof according to one or more placement rules. The robotic system 100 can derive the packing plan 700 based on overlaying object models over the discretized container model at the candidate positions 801. The robotic system 100 can estimate one or more attributes (e.g., physical arrangements of the objects, resulting weight, collision probabilities, stability, etc.) associated with the object models overlaid at the candidate positions 801.

In some embodiments, the robotic system 100 can derive the candidate positions 801 according to layers, thereby deriving and evaluating 2D plans. For example, the robotic system 100 can derive the object placement locations (e.g., validate instances of the candidate positions 801) that form the lowest layer where the placed objects directly contact the container base (i.e. the placement surface). In deriving the layer and/or for subsequent evaluations, the robotic system 100 may add the height measures 802 of FIG. 8A to the placement locations and process the locations in 3D. Once the lowest layer is derived/validated, the robotic system 100 can derive the candidate positions 801 for placement of objects on top of (e.g., directly contacting the top surfaces of) the objects planned for placement in the lowest layer. Accordingly, the robotic system 100 can derive the packing plan 700 that includes multiple 2D layers stacked on top of each other. Moreover, in deriving the packing plan 700, the robotic system 100 can derive and validate positions where the stacked objects each overhang one or more located below the stacked objects and utilize the support wall 725 for support. Details regarding the derivation of the packing plan 700 are described below.

At block 1110, the robotic system 100 can derive 2D plans (e.g., layers, such as the lower layer 712 and/or the stacked layer 722 illustrated in FIG. 7A) for placing the available packages 742 along corresponding horizontal planes. For example, the robotic system 100 can derive the 2D mappings of placement locations along the horizontal plane for a subset of the available packages 742. The robotic system 100 can derive the placement plans based on the discretized models, such as by overlaying/comparing the discretized object models on/to the discretized container model. Accordingly, the robotic system 100 can analyze different arrangements (e.g., the candidate positions 801 of FIG. 8A) of the discretized object models and validate the arrangements that are within the boundaries of the discretized platform model. The robotic system 100 can designate the objects that cannot be placed within the boundaries of the discretized container model for another layer. Accordingly, the robotic system 100 can iteratively derive placement locations for the 2D layers of the packing plan 700 until each of the packages in the package set have been assigned a location.

In some embodiments, the robotic system 100 can generate the packing plan 700 and/or the layers therein based on the object groupings. For example, the robotic system 100 can determine the arrangements for the objects within one grouping before considering placements of objects in another grouping. When objects within an object grouping overflows a layer (i.e., cannot fit in one layer or one instance of the discretized platform model) and/or after placing all packages of one grouping, the robotic system 100 can assign locations for the objects in the next grouping to any remaining/unoccupied areas in the discretized container model. The robotic system 100 can iteratively repeat the assignments until none of the unassigned objects can fit over remaining spaces of the discretized container model.

Similarly, the robotic system 100 can generate the plan layers based on the processing order (e.g., based on the object groupings according to the processing order). For example, the robotic system 100 can determine a test arrangement based on assigning objects and/or groupings according to the processing order. The robotic system 100 can assign the earliest sequenced object/grouping an initial placement for the test arrangement, and then test/assign the subsequent objects/groupings according to the processing order. In some embodiments, the robotic system 100 can retain the processing order for the objects/groupings across layers (e.g., across instances of the placement plans 350). In some embodiments, the robotic system 100 can rederive and update (illustrated using dashed feedback line in FIG. 6) the processing order after each layer is filled. In some embodiments, as an illustrative example of the above-described processes, the robotic system 100 can generate the 2D plans by identifying the different/unique package types within each of the object groupings and/or the package set.

The robotic system 100 can derive (e.g., iteratively) placement locations for each of the available packages 742. The robotic system 100 can determine an initial placement location (e.g., the candidate position 801) for the unique object first in sequence according to the processing order. The robotic system 100 can determine the initial placement location according to a predetermined pattern (e.g., a predetermined sequence of orientations/positions) as described above. In some embodiments, the robotic system 100 can calculate initial placements for each unique package. The resulting initial placements can each be developed into a unique placement combination (e.g., an instance of the search tree 754 of FIG. 7B), such as by tracking the combination of placement locations across iterations. The robotic system 100 can derive and track candidate placement locations for the subsequent objects according to the processing order and/or the remaining packages as described above. Accordingly, the robotic system 100 can iteratively derive the placement combinations 744 of FIG. 7B.

In deriving the placement combinations 744 (e.g., a set of candidate positions 801), the robotic system 100 can iteratively derive and evaluate candidate stacking scenarios (e.g., potential placement of objects on top of the objects at the derived candidate positions 801). For example, the robotic system 100 can evaluate the set of candidate positions 801 in a layer according to a resulting top surface area, a stability estimate, a support estimate, and/or other criteria. The evaluated criteria can require/prefer that the discretized object models entirely fit within horizontal boundaries of the placement zone. Also, the placement criteria can require that placement of the discretized object models be within a threshold distance relative to the initial placement location (e.g., such as along a horizontal direction) and/or the previous placement location, such as for adjacent placements or separation requirements. Other examples of the placement criteria can include preferences for adjacently placing packages having smallest difference(s) in one or more package dimensions (e.g., height), the fragility ratings, the package weight ranges, or a combination thereof. In some embodiments, the placement criteria can include collision probabilities that can correspond to locations and/or characteristics (e.g., height) of previously assigned packages in the layer relative to a reference location (e.g., location of the palletizing robot). Accordingly, the robotic system 100 can generate multiple unique placement combinations (i.e., candidate placement plans for each layer and/or the candidate stacking scenarios that each include multiple layers) of package placement locations. In some embodiments, the robotic system 100 can track the placements of the combination based on generating and updating the search tree 754 across the placement iterations.

In finalizing the placement locations for a 2D layer, the robotic system 100 can calculate/update a placement score for each combination/package placement. The robotic system 100 can calculate the placement score according to one or more of the placement conditions/preferences (e.g., package dimensions, collision probabilities, fragility ratings, package weight ranges, separation requirements, package quantity conditions). For example, the robotic system 100 can use preference factors (e.g., multiplier weights) and/or equations to describe a preference for: separation distances between packages, differences in package dimensions/fragility ratings/package weights for adjacent packages, the collision probabilities, continuous/adjacent surfaces at the same height, a statistical result thereof (e.g., average, maximum, minimum, standard deviation, etc.), or a combination thereof. Each combination can be scored according to the preference factors and/or the equations that may be predefined by a system manufacturer, an order, and/or a system operator. In some embodiments, the robotic system 100 can calculate the placement score at the end of the overall placement iterations.

In some embodiments, the robotic system 100 can update the sequence of the placement combinations 744 in the priority queue 756 of FIG. 7B after each placement iteration. The robotic system 100 can update the sequence based on the placement score.

The robotic system 100 can stop the placement iterations (e.g., completion of one candidate placement plan) based on determining an empty source status, a full layer status, or an unchanged score status. The empty source status can represent that all of the available objects have been placed. The full layer status can represent that no other objects can be placed in the remaining areas of the considered discretized container model. The unchanged score status can represent that the placement score for the combination remains constant across one or more consecutive placement iterations. In some embodiments, the robotic system 100 can repeat the placement iterations using different initial placement locations and/or different processing order (e.g., for reordering groups having same sequencing value/score associated with the sequencing conditions) to derive other instances of the candidate stacking scenarios. In other words, the robotic system 100 can generate multiple 2D placement plans, where each 2D placement plan can represent a layer within a 3D stack (e.g., an instance of the candidate stacking scenarios). In other embodiments, the robotic system 100 can iteratively consider the 3D effect as a 2D placement plan is derived and begin deriving the next layer as a next iteration when the 2D placement plan becomes full.

At block 1112, the robotic system 100 can compute stacking scenarios for the 2D plan. In doing so, the robotic system 100 can convert each of the placement combinations 744 and/or the 2D placement plans into 3D states as illustrated at block 1152. For example, the robotic system 100 can assign the height values of the objects to the placement combinations 744. The robotic system 100 may generate a contour map (an estimate of a depth map) based on calculating the height measure 802 for each of the discretization units 602/pixel of the container model (e.g., the container footprint model 622) according to the heights of the corresponding objects in the placement combinations 744. For multiple layers, the robotic system 100 can calculate the height measures 802 that combine the heights of the objects planned for placement/stacking at the pixelated location.

With the 3D states, the robotic system 100 can evaluate the placement combinations 744 according to one or more stacking rules (e.g., the horizontal offset rule 776 of FIG. 7C, the support separation rule 786 of FIG. 7C, and/or the vertical offset rule 790 of FIG. 7C). As an illustrative example, the robotic system 100 can calculate a reduced score for the placement combinations 744 or flag locations thereof that violate the overlap requirement 778 of FIG. 7C, the overhang requirement 780 of FIG. 7C, the vertical offset rule 790, the CoM offset requirement 784 of FIG. 7C, or a combination thereof described above. In one or more embodiments, the robotic system 100 can calculate fragility ratings of one or more objects, such as by estimating the supported weights at the overlapped packages and comparing them to the corresponding fragility ratings of the objects planned for the lower layers.

At block 1154, the robotic system 100 can select combinations according to 3D scores/updates. In other words, the robotic system 100 can calculate 3D placement scores or update the placement scores and select the combinations accordingly. The robotic system 100 can use predetermined preferences (e.g., weights and/or equations) associated with placement costs and/or heuristic values for 3D placements. The predetermined 3D preferences can be similar to the 2D preferences, grouping preferences, sequencing conditions, or a combination thereof. For example, the 3D preferences can be configured to calculate collision probabilities based on the 3D state and to calculate scores that favor the placement combinations with lower collision probabilities. Also, the robotic system 100 can calculate the scores based on the remaining packages 752, sizes of support areas with common height, number of packed items in the 3D state, difference between the heights of the processed packages, or a combination thereof. In some embodiments, the robotic system 100 can update the sequence of the placement combinations 744 in the priority queue 756 according to the scores.

After the 3D states have been processed, the robotic system 100 can update the 2D plans by deriving a placement for the next package in the remaining packages 752, such as at block 1110. The robotic system 100 can repeat the above-described process until a stopping condition, such as when all of the available packages 742 have been processed (i.e., empty value/set for the remaining packages 752) and/or when the placement combinations 744 cannot be improved (also referred to as unimproved combinations). Some examples of unimproved combinations can include when the currently processed placement eliminates the last of the placement combinations 744 in the priority queue 756 due to one or more of the violations and/or when the placement score remains constant for the preferred combinations across a threshold number of iterations.

When the stopping condition is detected, the robotic system 100 can select one of the derived placement combinations 744 according to the placement scores (e.g., the 2D and/or the 3D related scores). Accordingly, the robotic system 100 can designate the selected placement combination as the packing plan 700.

As an illustrative example, the robotic system 100 can implement the functions of block 1110 and 1112 differently. For example, at block 1110, the robotic system 100 can generate the 2D plan (e.g., an instance of the placement plan 350) for a bottom layer as described above. In doing so, the robotic system 100 can be configured to place heavier preference (e.g., greater parameter weights) for matching package heights, heavier package weights and/or greater supportable weight for the packages in considering the placements and/or the processing order. The robotic system 100 can derive the first 2D plan for the base layer as described above for block 1110.

Once the first 2D layer is complete/full as described above, thereby forming the base layer, the robotic system 100 can convert the placement plan into 3D states as described for block 1112. Using the 3D information, the robotic system 100 can identify one or more planar sections/areas of the base layer as described above. Using the planar sections, the robotic system 100 can iteratively/recursively derive package placements for the next layer above the base layer. The robotic system 100 may effectively consider each of the planar sections as new instances of the discretized platform and test/evaluate different placements as described above for block 1110. In some embodiments, the robotic system 100 can derive the 2D placements using the placement surfaces but calculate the score across the entirety of the placement area/space. Accordingly, the robotic system 100 can be configured to follow preferences for larger placement areas for subsequent layers without being limited to the preceding placement areas.

Once the iterative placement process stops for the second layer, the robotic system 100 can calculate planar sections (e.g., top surfaces having heights within a threshold range) for the derived layer to generate the 2D placements of the remaining packages/groupings for the next above layer. The iterative layering process can continue until the stopping condition has been met as described above.

In deriving the 2D plans for the second layer and higher, the robotic system 100 can derive object placement locations where the object for planned placement overhangs one or more objects below (i.e. the objects in the 2D placement plan of a lower layer). For example, the robotic system 100 can derive the 2D plan for a lower/first layer where a first object (e.g., the support package 774 of FIG. 7C) is directly adjacent to the support wall 725 and separated by the object-wall separation 726. In deriving the 2D plan for a higher/stacked layer, the robotic system 100 can derive the candidate position 801 for a second object (e.g., the stacked object 724) to be stacked/placed on top of the first object with a portion of the second object laterally protruding beyond a peripheral edge of the first object and toward the support wall 725. The robotic system 100 can derive and validate the candidate position 801 for utilizing the support wall 725 to support the second object placement.

At block 1122, as an illustrative example, the robotic system 100 may derive the candidate position 801 associated with wall-support in deriving the 2D placement plans. In other words, the robotic system 100 can derive positions for the second object (e.g., the stacked object 724) where the object directly contacts and is supported by the support wall 725 once the second object is placed. The robotic system 100 can further derive positions for the second object that is separated from the support wall 725 by less than a threshold distance such that the object may contact and be supported by the support wall 725 in the event that the object shifts during container transport. The candidate position 801 can be within the discretized container model for placing the second object. The candidate position 801 can also be such that the second object would laterally protrude beyond peripheral edge(s) of the first object (e.g., overhanging the first object) and laterally protrude toward the support wall 725.

At block 1124, the robotic system 100 can estimate one or more attributes for the candidate position 801. In other words, the robotic system 100 can compute likely physical results of placing the second object at the candidate position 801. The robotic system 100 can estimate the one or more attributes based on placing the first object model at the first placement location and the second object model at the candidate position.

At block 1132, the robotic system 100 may derive the combined object estimation 732 of FIG. 7 for multiple-overhang scenarios. A multiple-overhang scenario can include the intermediate object 799 of FIG. 7C overhanging a lower object and the candidate position 801 overhangs the intermediate object 799 or an object above it. In some embodiments, the robotic system 100 can track placement locations that overhang a planned object below. Using the tracked status, the robotic system 100 can determine when the candidate position 801 overhangs the planned object below with one or more planned locations below also overhanging other objects.

When the candidate position 801 corresponds to a multiple-overhang scenario, the robotic system 100 may derive the combined object estimation 732 based on the candidate position 801 and the lowest estimated overhang position. The robotic system 100 can derive the combined object estimation 732 for estimating one or more attributes associated with the candidate position 801. The robotic system 100 may derive the combined object estimation 732 based on placing the object model for the stacked/processed object (e.g., the top package 772) at the candidate position 801 and the object models planned for placement below the candidate position 801, including the object model for the intermediate object 799. In some embodiments, the robotic system 100 may derive the combined object estimation 732 based on deriving an outline that aligns with or includes outer-most surfaces/edges of the placed set of object models. Accordingly, the robotic system 100 may derive a model or an estimate that represents the set of overhanging stacked objects as one object.

At block 1134, the robotic system 100 may calculate effective support and/or overhang measures. For example, the robotic system 100 may calculate the effective support 795 of FIG. 7C based on counting the number of the discretization units 602 that overlap between the object models of the stacked objects, such as for the top package 772 and the support package 774, at the planned locations. For the multiple-overhang scenarios, the robotic system 100 may calculate the effective support 795 based on overlaps between the object model of the top package 772 at the candidate position 801 and models of objects planned for placement below the candidate position 801. In some embodiments, the robotic system 100 may calculate the effective support 795 as the smallest amount of overlap between the model at the candidate position 801 and the models below, such as for the support object that is furthest away from the support wall 725. In other embodiments, the robotic system 100 may calculate the effective support 795 as the overlap between the top object and the bottom-most object. In yet other embodiments, the robotic system 100 may calculate the effective support 795 as the overlap between the combined object estimation 732 and one or more objects below.

Also, the robotic system 100 may calculate the overhang measures based on counting the number of the discretization units 602 of the top object model that extend beyond the peripheral edge of the bottom object model and toward the support wall 725. In some embodiments, the robotic system 100 may calculate the overhang measure based on the portions (e.g., the number of the discretization units 602) of the top object model that remain separate from the effective support 795.

At block 1136, the robotic system 100 may estimate the CoM location 782 for the top object model at the candidate location. In some embodiments, the robotic system 100 may estimate the CoM location 782 based on accessing the predetermined information in the object model and/or from the master data 252. Also, in some embodiments, the robotic system 100 may estimate the CoM location as the middle portion of the object model.

The robotic system 100 may further derive a relationship between the CoM location 782 and the object below. For example, the robotic system 100 can determine the CoM location 482 of the top package 772 relative to the peripheral edge of the support package 774.

For the multiple-overhang scenarios, the robotic system 100 may derive the combined reference location 734 of FIG. 7C for the combined object estimation 732. The robotic system 100 may derive the combined reference location 734 based on combining the CoM locations 782 for the stacked set of objects across a lateral area/dimension of the combined object estimation 732. The robotic system 100 may combine the CoM locations 782 based on calculating a weighted average or weight distribution according to the weight of the objects and the corresponding CoM locations 782 across the lateral area/dimension.

At block 1138, the robotic system 100 may estimate the pivot locations 793 for the candidate position 801. The robotic system 100 may estimate the pivot location 793 as the portion of the support package 774 having the highest height according to the stacking scenarios. When multiple portions of the support package 774 has the same height values or 3D states, the robotic system 100 can estimate the pivot location 793 as the portion(s) closest to the support wall 725. Accordingly, the robotic system 100 may estimate the pivot location as the peripheral edge of the support package 774.

At block 1140, the robotic system 100 may derive shifted poses based on the candidate position 801. For example, when the candidate position 801 has the top package 772 separated from (i.e., not directly contacting) the support wall 725, the robotic system 100 can derive the shifted poses based on shifting the top object model from the candidate position 801 toward the support wall 725. The robotic system 100 can laterally shift the top object model until the model contacts the support wall 725. Also, the robotic system 100 can derive the shifted poses based on rotating the top object model about the pivot location. The robotic system 100 can ignore or disregard the rotated poses when the CoM location 782 is above the support package 774. The robotic system 100 can retain the rotated poses when the CoM location 782 is between the peripheral edge of the support package 774 and the support wall 725. The shifted poses can represent the top package 772 shifting from the candidate position 801, such as during transport of the container, and/or coming to rest against the support wall 725.

At block 1126, the robotic system 100 can derive the approach path 901 of FIG. 9A for placing the top package 772 at the candidate position 801. The robotic system 100 can derive the approach path 901 based on deriving a combination of the top object model and the gripper model. In some embodiments, the robotic system 100 can derive the combination of the models based on adjusting for the engaged interface height 534 of FIG. 5C. The robotic system 100 can derive the approach path 901 based on placing the combined model at the candidate position 801. Accordingly, the robotic system 100 can overlay the combined model over the container model and/or other object models.

In some embodiments, the robotic system 100 can derive the approach path 901 based on identifying the laterally-extending lane 912 of FIG. 9C. As described above, the robotic system 100 can identify the laterally-extending lane 912 based on extending lateral lines from peripheral edges/points of the combined model toward the planned location of the robotic unit. In some embodiments, the robotic system 100 can widen the lane 912 according to predetermined clearance distances.

Using the laterally-extending lane 912, the robotic system 100 can identify one or more potential obstacles. For example, the robotic system 100 can identify the potential obstacles as the preceding objects 902 of FIG. 9A (e.g., objects planned for placement before the top package 772) and/or the support wall 725 that overlaps with the lane 912. In other words, the robotic system 100 can determine whether, at the evaluated height, the laterally-extending lane 912 overlaps with the one or more potential obstacles.

As an illustrative example, the robotic system 100 can derive the approach path 901 by incrementally identifying the lanes 912 at different heights as shown at block 1142, and iteratively identify potential obstacles for the lanes as shown at block 1144. In other words, the robotic system 100 can iteratively increase the height of the laterally-extending lane 912 according to the approach increments 903 when the lane 912 overlaps at least one potential obstacle. Accordingly, the robotic system 100 can identify the height at which the laterally-extending lane 912 clears all potential obstacles. The robotic system 100 can derive the path segments 904 of FIG. 9A and/or the final segment 906 of FIG. 9A based on the identified height. Thus, the robotic system 100 can derive the approach path in reverse (e.g., starting from the candidate position 801 to the starting point) for simulating a transfer of the top package 772. The laterally-extending lane 912 can correspond to the space occupied by the end-effector 304 and the top package 772 during lateral movement to the candidate position 801.

At block 1128, the robotic system 100 can validate the candidate position 801 for the object placement. The robotic system 100 may validate the candidate position 801 in deriving the placement locations for the packing plan 700. The robotic system 100 can validate the candidate position 801 based on evaluating the estimated attributes according to the corresponding rules/thresholds. In some embodiments, the robotic system 100 can identify the candidate positions 801 that are directly adjacent to the support wall or contacting the support wall (e.g., one or more peripheral boundaries of the object model at the candidate positions 801 overlapping one or more boundaries of the container/wall). For the identified candidate positions 801, the robotic system 100 can validate according to the corresponding rules. For example, the robotic system 100 can validate the candidate position 801 when the estimated attributes satisfy the wall-support rule 794 of FIG. 7C and/or other associated rules (e.g., the tilt-support rule 796 of FIG. 7C and/or the multiple overhang rule 798 of FIG. 7C) that represents one or more requirements for placing objects according to pre-determined relationships to vertically-oriented container portions.

For example, the robotic system 100 can validate the candidate position 801 based on determining that the effective support 795 (e.g., the number of overlapped pixels) satisfies the overlap requirement 778 of FIG. 7 for an object placed directly adjacent to the container wall and/or satisfies the wall-support rule 794 for an object placed contacting the container wall. Also, the robotic system 100 can validate the candidate position 801 based on determining that the overhang measure satisfies the overhang requirement 780 of FIG. 7C for an object placed directly adjacent to the container wall and/or satisfies the wall-support rule 794 for an object placed contacting the container wall. Further, the robotic system 100 can validate the candidate position 801 based on determining that the CoM location 782 satisfies the CoM offset requirement 784, such as when the CoM location 782 is within peripheral edges of the models for the support package(s) 774, within a threshold distance from such peripheral edges, and/or within a threshold distance from the CoM locations of one or more support package(s) 774 (e.g., when the support packages are planned to be stacked on top of other lower objects). For validating the candidate position 801 of an object placed directly adjacent to the container wall, the robotic system 100 may additionally or alternatively validate the candidate position 801 when the one or more shifted poses (e.g., the tilt angle 797 of FIG. 7) satisfy the tilt-support rule 796.

In some embodiments, as discussed above (e.g., with respect to block 1132), the robotic system 100 can identify multiple overhang conditions associated with or caused by the candidate position 801. For validating the candidate position 801 associated with multiple overhang conditions, the robotic system 100 can evaluate the candidate position 801 (e.g., the associated effective support 795 relative to bottom-most, most-offset, and/or other qualifying support object underneath) according to the multiple overhang rule 798. Alternatively or additionally, the robotic system 100 may validate based on evaluating the combined object estimation 732 according to the horizontal offset rule 776, the wall-support rule 794, and/or one or more other rules described above. Accordingly, the robotic system 100 can validate the candidate position 801 associated with multiple overhang conditions when the one or more computed attributes satisfy the corresponding rules and requirements.

The robotic system 100 can also validate the candidate position 801 based on the corresponding approach path 901. The robotic system 100 can validate the candidate positions 801 that correspond to the approach path 901 that is unobstructed as described above. In some embodiments, the robotic system 100 can disqualify the candidate position 801 upon failure to successfully derive the approach path 901 from/to the candidate position 801 that is clear of all potential obstacles 910. As described above, the robotic system 100 can utilize the combination of the gripper model and the corresponding object model along with any grip-related adjustments (e.g., by accounting for a difference between the engaged interface height 534 and the extended interface height 532) in deriving/validating with respect to the approach path 901.

In some embodiments, the robotic system 100 may iteratively analyze a set of potential placement locations for the target object 112. As a result, the robotic system 100 may generate multiple validated positions for the same target object 112. For such scenarios, the robotic system 100 may be configured to select one validated position as the placement position for the object. For example, the robotic system 100 may calculate a placement score for the corresponding position during the validation process and select the position having the highest score. As an illustrative example, the robotic system 100 may calculate a higher placement score for the position corresponding to greater effective support 795. Also, as an illustrative example, the robotic system 100 may calculate a higher placement score for the position associated with a shorter approach path.

As a further illustrative example, when the placed package is stacked on/over one or more previously processed packages, the robotic system 100 can eliminate any of the placement combinations 744 that violate the overlap requirement 778, the overhang requirement 780, the vertical offset rule 790, the CoM offset requirement 784, or a combination thereof, described above. In one or more embodiments, the robotic system 100 can eliminate any of the placement combinations 744 that violate fragility ratings of one or more packages under the processed package, such as by estimating the supported weights at the overlapped packages and comparing them to the corresponding fragility ratings. The robotic system 100 may select the placement location based on the remaining combinations.

In some embodiments, the robotic system 100 may implement the method 1100 or a portion thereof offline, such as when orders and shipping manifests are received and before the targeted set of objects become available for real-time processing/placement. Alternatively or additionally, the robotic system 100 may implement the method 1100 or a portion thereof in real-time. For example, the robotic system 100 may implement a portion of the method 1100 to rederive the packing plan when the container has one or more of the unexpected features 1002 of FIG. 10. The robotic system 100 may obtain image data representing the container at the task location 116 (e.g., the sensor output 1000 corresponding to the top-view image 1052 and/or the side-view image 1054, all illustrated in FIG. 10). The robotic system 100 can analyze the obtained image data, such as based on detecting and analyzing edges depicted therein, to detect or determine the existence of the unexpected features 1002. As described in detail below, the robotic system 100 may evaluate the existing packing plan 700 with respect to the unexpected features 1002 and adjust/validate the existing packing plan 700.

When the adjustments to the existing packing plan 700 is not available or cannot be validated, the robotic system 100 may implement a portion of the method 1100. For example, the robotic system 100 can redetermine package groupings (block 1106) and/or processing order (block 1108) for the objects associated with the existing packing plan 700. In some embodiments, the robotic system 100 may access the previously determined instances of the package groupings and/or the processing order. With the resulting information, the robotic system 100 can rederive new 2D plans using the obtained image(s) instead of the container model(s). Accordingly, the robotic system 100 can account for the unexpected features 1002 and derive a new instance of the packing plan that replaces the existing packing plan 700.

At block 1116, the robotic system 100 can implement the packing plan 700 (resulting from real-time processing or offline processing) for placing the available packages 742 in the container(s). The robotic system 100 can implement the packing plan 700 based on communicating one or more motion plans, actuator commands/settings, or a combination thereof to the corresponding device/unit (e.g., the transfer unit 104 of FIG. 1, the actuation devices 212 of FIG. 2, the sensors 216 of FIG. 2, etc.) according to the packing plan 700. The robotic system 100 can further implement the packing plan 700 based on executing the communicated information at the devices/units to transfer the available packages 742 from a source location to the destination container. Accordingly, the robotic system 100 can place the available packages 742 according to the corresponding 3D placement locations in the packing plan 700.

Figure 12:
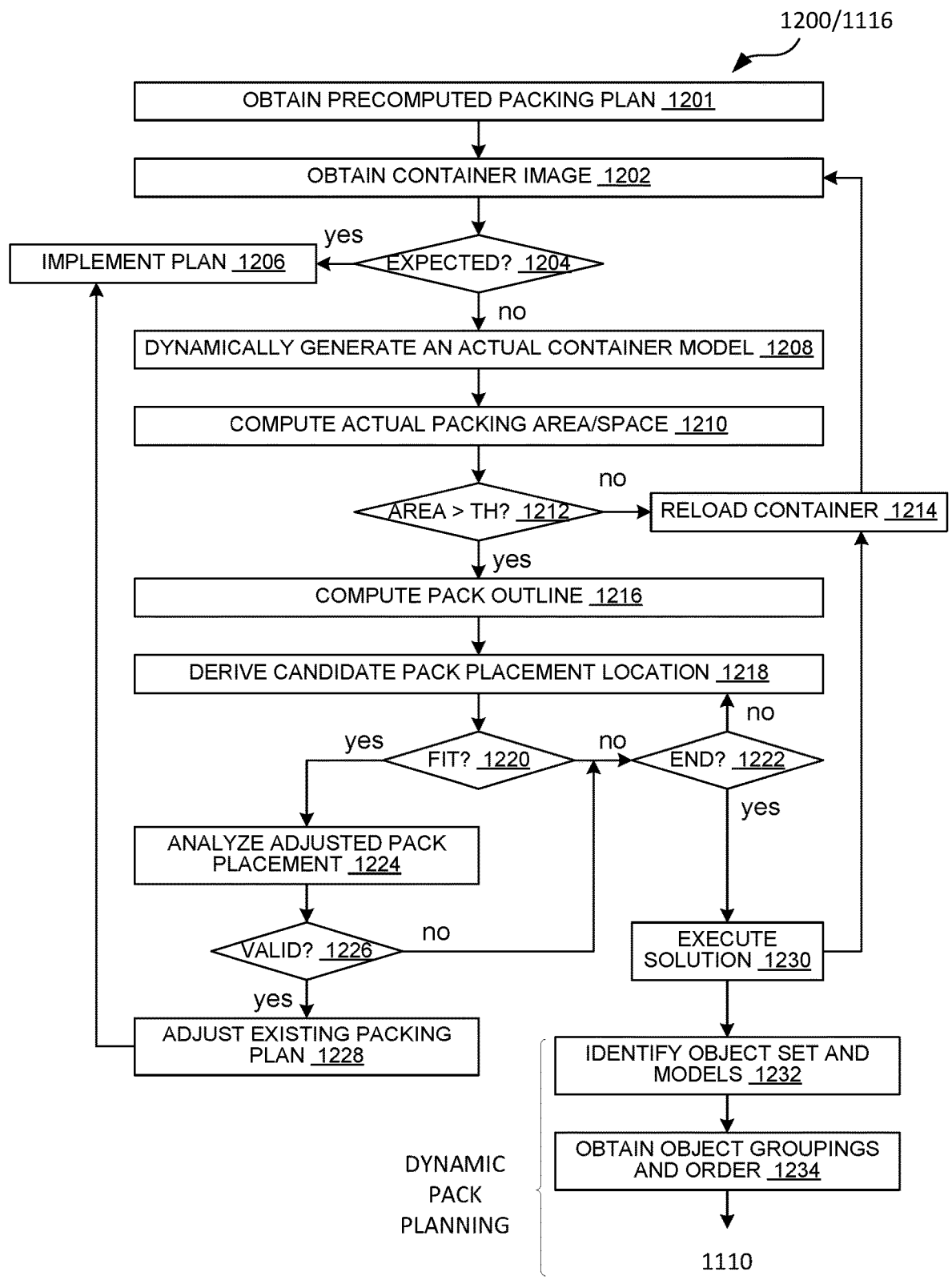
FIG. 12 is a flow diagram for a second example method of operating the robotic system of FIG. 1 in accordance with one or more embodiments of the present technology.

FIG. 12 is a flow diagram for a second example method 1200 of operating the robotic system 100 of FIG. 1 in accordance with one or more embodiments of the present technology. In some embodiments, the method 1200 can be implemented as a subroutine of processes corresponding to block 1116 of FIG. 11. For example, during or at a beginning of a real-time operation for placing the available packages 742 of FIG. 7B into a container, the robotic system 100 may obtain one or more precomputed packing plans (e.g., the packing plan 700 of FIG. 7A) as illustrated at block 1201. The robotic system 100 may obtain the packing plan 700 derived before initiating the real-time packing operation (e.g., via offline computation). The robotic system 100 may store the packing plan 700 based in a storage device (e.g., the storage device 204 of FIG. 2 and/or another computer-readable medium). The robotic system 100 can obtain or access the existing packing plan 700 by reading from the storage device.

At block 1202, the robotic system 100 may obtain one or more images (e.g., the top-view image 1052 and/or the side-view image 1054, both illustrated in FIG. 11) depicting the container as illustrated at block 1202. As described above, the robotic system 100 can obtain the images in real-time via one or more of the sensors 216 (e.g., the top-view sensor 310 and/or the side-view sensor 312 illustrated in FIG. 3) associated with the task location 116 of FIG. 1. Accordingly, the robotic system 100 may obtain the one or more real-time images of the container (e.g., the cart 410 or the cage 420 illustrated in FIGS. 4A-4D) designated to receive the available packages 742 or a subset thereof. The robotic system 100 may obtain the one or more images during or at a beginning of a real-time operation for placing the available packages 742 into the container located at the task location 116. In other words, the robotic system 100 may obtain the images depicting the container before any objects are placed therein or after placing one or more objects.

At decision block 1204, the robotic system 100 can determine whether one or more physical attributes of the container are as expected based on the real-time image(s). The robotic system 100 can analyze the obtained real-time image data to identify one or more physical attributes of the depicted container. For example, the robotic system 100 can implement an edge detection mechanism (e.g., a Sobel filter) to detect 2D and/or 3D edges depicted in the image data. The robotic system 100 can further identify corners and/or junctions that connect two or more edge segments. Based on the edges and the corners/junctions, the robotic system 100 can identify regions bounded by the edges as corresponding to a structure, such as the container and/or a portion thereof. The robotic system 100 can further verify the estimates for the container and/or portions thereof based on predetermined thresholds and/or templates corresponding to a designated container pose (e.g., a location and/or an orientation) at the task location 116, an expected size of the container, an expected dimension of the container, a set of tolerance measures, and/or other known or expected physical traits of the container.

In estimating or recognizing the container depicted in the image data, the robotic system 100 may determine whether one or more physical attributes of the container are as expected. For example, the robotic system 100 can determine whether locations, shapes, and/or orientations of the container walls (e.g., the side walls and/or the back wall) are as expected. The robotic system 100 may determine the state of the container based on comparing the estimated container or a portion thereof to a template. Additionally or alternatively, the robotic system 100 can calculate a confidence score associated with the estimates for the container and/or a portion thereof. The robotic system 100 can detect whether the one or more physical attributes (e.g., status of one or more container walls) are as expected when the corresponding portions are within threshold ranges defined by the template and/or when the corresponding confidence score satisfies an expectation threshold. The robotic system 100 can detect an unexpected condition (e.g., error conditions associated with the container or one or more support walls thereof) when the corresponding portions are beyond threshold ranges defined by the template and/or when the corresponding confidence score fails to satisfy the expectation threshold. Detection of the unexpected condition can represent detection of the unexpected feature 1002 of FIG. 10.

At block 1206, the robotic system 100 can implement a current/active instance of the packing plan. For example, when the container at the task location 116 corresponds to the expected conditions, the robotic system 100 can implement the existing instance (i.e., unadjusted after the initial/offline computation) of the packing plan 700. Also, as described in detail below, the robotic system 100 can implement an adjusted instance of the packing plan. The robotic system 100 can implement the packing plan based on controlling a robotic unit (e.g., via sending commands/settings to the robotic unit and executing the commands/settings at the robotic unit) according to the packing plan 700. Accordingly, the robotic system 100 can place the available packages 742 at corresponding placement locations within the container according to the packing plan 700.

When the container at the task location 116 corresponds to unexpected conditions, such as illustrated at block 1208, the robotic system 100 may dynamically generate an actual container model. In other words, the robotic system 100 can dynamically generate a container model that accounts for the real-time state (e.g., the unexpected features 1002) of the actual container. For subsequent processing/analysis, the robotic system 100 can use the actual container model instead of the container model that represents expected conditions of the container (e.g., the container footprint model 622 of FIG. 6 and/or the container profile model 624 of FIG. 6).

The robotic system 100 can dynamically generate the actual container model based on the real-time image data. For example, the robotic system 100 can dynamically generate the actual container model based on dividing the top-view image 1052 and/or the side-view image 1054 according to the discretization units 602 of FIG. 6. The robotic system 100 can identify or estimate the reference location 604 of FIG. 6 (e.g., a center portion and/or a predetermined corner) for the container detected in the real-time image. The robotic system 100 can align or reorient the image such that one or more detected edges that have predetermined relationship to the estimated reference location 604 (e.g., edges that coincide with the reference location) align with predetermined reference directions/axes for the system and the corresponding space. Based on the reference location and the axes alignment, the robotic system 100 can identify divisions based on the dimensions of the discretization units 602, thereby pixelating the real-time image(s).

At block 1210, the robotic system 100 can compute actual packing area/space within the container at the task location 116. The robotic system 100 can estimate a placement zone between the estimated container walls. For example, the robotic system 100 can identify or estimate portions within the image data as the container walls based on one or more predetermined physical traits of the walls (e.g., size, location, orientation, shape, color, etc.). The robotic system 100 can identify the portions within the image data between the walls as the placement zone of the actual container. In some embodiments, the robotic system 100 can identify the placement zone as a rectangular-shaped area that is aligned with one or more of the system axes and coincident with edges of the container walls/container base closest to the center portion of the container. In other words, the robotic system 100 can identify the placement zone as an instance of an axis aligned bounding box for the area/space between the container walls.

The robotic system 100 can further analyze the placement zone to compute the actual packing area/space. For example, the robotic system 100 can calculate a size and/or a set of dimensions for the placement zone. In some embodiments, the robotic system 100 may calculate the size and/or the set of dimensions based on the discretization units 602. Accordingly, the robotic system 100 may represent the actual packing area/space as a total quantity of the discretization units 602 within the placement zone and/or lengths (e.g., a number of discretization units 602) along the system axes. In calculating the size/dimensions, the robotic system 100 can round down or ignore the discretization units 602 that extend beyond the placement zone (i.e., the discretization units 602 that overlap or partially include the container walls or areas outside of the container base).

At decision block 1212, the robotic system 100 can determine whether the computed area/space is greater than one or more minimum threshold requirements for packing area/space. For example, the robotic system 100 can compare the size/dimensions of the placement zone to a minimum threshold generically applicable to all containers.

Additionally or alternatively, the robotic system 100 can compare the size to that of the existing packing plan 700.

When the available placement area/space fails to satisfy the compared threshold(s), such as illustrated at block 1214, the robotic system 100 can reload or replace the container at the task location 116. For example, when the computed placement area/space of the container at the task location 116 is not greater than the minimum threshold, the robotic system 100 can communicate with a transport unit/robot and/or a corresponding system to (1) remove the container at the task location 116, and/or (2) place a new/different container at the task location 116. When a new container is placed at the task location 116, the robotic system 100 can obtain the container image as illustrated at block 1202 and described above.

When the available placement area/space satisfies the minimum threshold, such as at block 1216, the robotic system 100 can compute a pack outline. For example, the robotic system 100 can derive the AABB 730 based on the existing packing plan 700. The robotic system 100 can derive the AABB 730 as a representation of one or more physical attributes of the set of objects planned for placement. The robotic system 100 can derive the AABB 730 according to a designated planar shape (e.g., a rectangle). The robotic system 100 can align the designated planar shape to the system axes and a peripheral point (e.g., one of the outer-most portions) of the packing plan 700. The robotic system 100 can subsequently extend/move other/non-aligned edges of the designated planar shape to be coincident with other peripheral points of the packing plan 700. In some embodiments, for example, the robotic system 100 can compute a rectangle that represents overall dimensions of the packing plan 700 along the system axes. Accordingly, the robotic system 10 can compute the AABB 730 that coincides with outer-most points of the existing packing plan 700.

At block 1218, the robotic system 100 can derive a candidate pack placement location. The robotic system 100 can derive the candidate pack location for adjusting placements of the existing packing plan within the container. In some embodiments, the robotic system 100 can derive the candidate pack location as a corner of the actual container model (e.g., the placement area of the container). The robotic system 100 can derive the candidate pack location such that a corner of the AABB 730 aligns with the corner of the actual container model. For example, the robotic system 100 can select the corner according to a predetermined pattern/sequence. Based on the selected corner, the robotic system 100 can calculate coordinates/offsets for the AABB 730 and/or the reference point of the actual container model such that the corresponding corners of the AABB 730 and the actual container model align or coincide.

Accordingly, the robotic system 100 can overlay the AABB 730 on the actual container model according to the candidate pack location such that the corresponding corners are aligned. At decision block 1220, the robotic system 100 can determine whether the pack outline overlaid at the candidate pack placement location fits within the available placement area/space. The robotic system 100 can determine a fit status according to whether the AABB 730 overlaps with and/or extends beyond at least one peripheral edge of the actual container model. In some embodiments, the robotic system 100 can determine the fit status based on calculating dimensions of the AABB 730 (e.g., numbers of the discretization units 602 along the system axes) and comparing the calculated dimensions to dimensions of the placement zone.

When the pack outline at the candidate pack placement location does not fit within the available placement area/space, such as illustrated at decision block 1222, the robotic system 100 can determine whether an end condition has been reached. For example, the robotic system 100 can determine whether all possible candidate pack placement locations (e.g., all corners and/or other available locations associated with the actual container model) have been analyzed/processed. When the robotic system 100 determines that the end condition has not been reached, the robotic system 100 can derive another candidate pack placement location at block 1218. Accordingly, the robotic system 100 can iteratively process and analyze potential candidate pack placement locations until the fit status indicates that the AABB 730 fits within the actual container model or the end condition is reached.

When the pack outline at the candidate pack placement location fits within the available placement area/space, such as illustrated at decision block 1224, the robotic system 100 can analyze the adjusted pack placement. The robotic system 100 can analyze the adjusted pack placement (e.g., the packing plan 700 shifted according to the fitting candidate pack placement location) as part of a validation process. For example, the robotic system 100 can analyze the adjusted pack placement based on one or more resulting approach paths and/or support requirements for one or more objects.

In some embodiments, the robotic system 100 can determine whether the existing packing plan 700 includes one or more placement locations for placing corresponding objects designated to be supported by a vertical wall of the container (e.g., the support wall 725 of FIG. 7A). For example, the robotic system 100 can indicate the wall-supported locations during the initial derivation of the packing plan 700. Accordingly, the robotic system 100 can subsequently determine whether the existing packing plan 700 includes one or more wall-supported placement locations based on accessing the packing plan 700 and the predetermined indications. Alternatively or additionally, the robotic system 100 can overlay the existing packing plan 700 over the expected container model (e.g., the container footprint model 622 and/or the container profile model 624 that does not account for the unexpected features 1002). The robotic system 100 can determine that the existing packing plan 700 includes one or more wall-supported placement locations when a portion of the existing packing plan 700 coincides with or is within a predetermined distance from container-wall portions of the expected container model.

The robotic system 100 can determine updated placement locations for the identified wall-supported placement locations in the existing packing plan 700. For example, the robotic system 100 can calculate translation parameters (e.g., linear displacements along and/or rotations about one or more system axes) that represent the difference between the existing packing plan 700 and the fitting candidate pack placement location. The robotic system 100 can apply the translation parameters to the identified wall-supported placement locations to determine the updated placement locations. As described further below, the robotic system 100 can analyze the updated placement locations for wall-support for validation purposes.

In some embodiments, the robotic system 100 can derive one or more updated instances of the approach path 901 FIG. 9A that correspond to the potential adjusted location(s) of the packing plan 700 and/or the placement locations therein. The updated instances of the approach path 901 can represent motion plans associated with placement of corresponding objects at adjusted locations that corresponds to shifting the existing packing plan 700 to the fitting candidate pack location. The robotic system 100 can select one or more object placement locations for the validation analysis. For example, the robotic system 100 can select for validation analysis a placement location of a first-placed object according to the existing packing plan 700. Additionally or alternatively, the robotic system 100 can select for validation analysis one or more placement locations forming one or more perimeter edges or a corner for the existing packing plan 700. For the selected placement location(s), the robotic system 100 can derive the corresponding approach path as described above (e.g., with respect to block 1126 of FIG. 11).

At decision block 1226, the robotic system 100 can determine whether or not the adjusted pack placement is valid. The robotic system 100 can validate the candidate pack placement location based on the fit status. In other words, the robotic system 100 can use the fit status for preliminary validation/qualification. Accordingly, the robotic system 100 can eliminate any candidate pack placement locations that result in the AABB 730 fitting within the actual container model. The robotic system 100 can further validate the fitting candidate pack placement locations based on, for example, the corresponding updated approach paths and/or the updated wall-support locations.

In some embodiments, the robotic system 100 can validate the fitting candidate pack location based on validating the updated wall-supported placement location according to one or more rules (e.g., the wall-support rule 794, the tilt-support rule 796, the multiple overhang rule 798, and/or other rules/requirements illustrated in FIG. 7C) configured to analyze support from a vertically-oriented structure. The robotic system 100 can validate according to the rules as described above (e.g., with regards to block 1110 and/or block 1128 of FIG. 11). The robotic system 100 can validate the fitting candidate pack location when one or more or all of the updated wall-supported placement locations satisfy the one or more wall-support related rules. Additionally or alternatively, the robotic system 100 can validate the fitting candidate pack location based on successfully deriving the updated approach path. In other words, the robotic system 100 can validate the fitting candidate pack location based on successfully deriving one or more or all of the updated instances of the approach path 901 for the selected reference location(s) that is/are clear of the potential obstacles 910 of FIG. 9A.

When the robotic system 100 validates the candidate pack placement location, such as illustrated at block 1228, the robotic system 100 can adjust the existing packing plan 700. The robotic system 100 can adjust the object placement locations and/or corresponding approach paths 901 (e.g., motion plans) of the existing packing plan 700 according to the validated candidate pack placement location. For example, the robotic system 100 can calculate a difference and corresponding translation parameters that represent the difference between the existing packing plan 700 and the fitting candidate pack placement location as described above. The robotic system 100 can apply the translation parameters to the object placement locations of the existing packing plan 700 to derive the adjusted/updated placement locations associated with the validated pack placement location. In other words, the robotic system 100 can shift the existing packing plan 700 and the corresponding placement locations according to the candidate pack placement location. Accordingly, the robotic system 100 can derive the updated placement locations directly based on adjusting/shifting the initial placement locations, such as without repeating the initial processes used to derive the placement locations described above (e.g., with respect to block 1110 of FIG. 11).

Alternatively or additionally, the robotic system 100 can calculate a difference between the initial instance and the updated instance of the approach path 901 for the reference placement location. For example, the robotic system 100 can calculate difference vectors or parameters necessary to adjust the initial instance of the approach path 901 to produce the updated instance thereof that corresponds to the validated pack placement location. The robotic system 100 can adjust the remaining approach paths/motion plans for other object placements, such as by applying the difference vectors/parameters thereto. Accordingly, the robotic system 100 can derive the updated approach paths/motion plans directly based on the difference vectors/parameters, such as without repeating the initial processes used to derive the approach paths 901 for the packing plan 700.

The robotic system 100 can implement the adjusted packing plan. For example, the processing flow can pass to block 1206 and the robotic system 100 can implement the current/active instance of the packing plan, such as the adjusted instance of the packing plan 700. Accordingly, the robotic system 100 can implement the adjusted packing plan for placing the set of objects in the container.

When the robotic system 100 fails to validate the candidate pack placement location, the robotic system 100 can determine whether an end condition has been reached, such as illustrated at decision block 1222. As described above, the robotic system 100 may iteratively consider multiple candidate pack placement locations. Upon reaching an end condition, such as when none of the available/analyzed candidate pack placement locations provide the AABB 730 that fits within the actual packing area/space, the robotic system may execute a solution as illustrated at block 1230. In some embodiments, executing the solution may include reloading the container at the task location 116 as described above with regards to block 1214.

In some embodiments, executing the solution may include a dynamic pack planning process. In other words, the robotic system 100 may dynamically re-derive a new packing plan for replacing the existing packing plan. For example, the robotic system 100 can implement the method 1100 of FIG. 11 or a portion thereof to derive a new packing plan for the container associated with the unexpected features. For the dynamic re-derivation, the robotic system 100 may identify the set of objects initially designated for placement within the container and models representative of such objects as illustrated at block 1232. The robotic system 100 can identify the unique types/categories of objects initially intended to be placed within the actual container at the task location 116. The robotic system 100 may also obtain the object models (e.g., the object footprint models 612 and/or the object profile models 614 illustrated in FIG. 6) representative of the identified unique object types/categories.

At block 1234, the robotic system 100 may obtain object groupings and/or orders. In some embodiments, the robotic system 100 can store the object groupings/orders that were computed during the initial derivation of the packing plan. The robotic system 100 may obtain the object groupings and/or orders by accessing the stored information. Alternatively, or additionally, the robotic system 100 can re-process the groupings/order as described above (e.g., with regards to blocks 1106 and/or 1108 of FIG. 11).

The robotic system 100 can process the resulting information to derive a new instance of the 2D plans, such as described above for block 1110 of FIG. 11. For the derivation, the robotic system 100 can use the actual container model instead of the expected container models that do not account for the unexpected features 1002.

For example, the robotic system 100 can determine candidate positions for placing the identified set of objects. The robotic system 100 can overlay the object models over the actual container model according to the determined candidate positions. The robotic system 100 can analyze the overlaid models and validate the candidate positions based on one or more placement rules as described above.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
   accessing an existing packing plan that represents a set of placement locations for placing a corresponding set of objects within a container;
   obtaining a real-time image that represents the container located at a task location and designated to receive the set of objects;
   detecting an unexpected condition based on the real-time image, wherein the unexpected condition represents error conditions associated with the container or one or more support walls thereof;
   dynamically generating an actual container model based on dividing the real-time image according to discretization units;
   computing a packing unit based on the existing packing plan, wherein the packing unit represents one or more physical attributes of the set of objects;
   deriving a candidate pack location for adjusting placements of the existing packing plan within the container;
   overlaying the packing unit on the actual container model, wherein the packing unit is placed over the actual container model according to the candidate pack location;
   determining a fit status based on the packing unit at the candidate pack location in comparison to the actual container model;
   determining whether the candidate pack location is valid based on the fit status;
   adjusting the existing packing plan according to the candidate pack location based on validation result; and
   implementing the adjusted packing plan for placing the set of objects in the container using a robotic arm and an end-effector.

2. The method of claim 1, wherein:
   computing the packing unit includes determining an axis aligned bounding box (AABB) for the existing packing plan, wherein the AABB includes one or more rectangles that are (1) aligned according to a set of predetermined axes and (2) coincides with outer-most points of the existing packing plan; and
   determining the fit status includes determining whether the AABB at the candidate pack location overlaps or extends beyond at least one peripheral edge of the actual container model.

3. The method of claim 1, wherein the candidate pack location represents a corner of the actual container model.

4. The method of claim 1, wherein determining whether the candidate pack location is valid includes:
   deriving an updated approach path representing a motion plan associated with placement of a reference object within the set of objects at an adjusted location that corresponds to shifting the packing plan to the candidate pack location; and
   validating the candidate pack location based on successfully deriving the updated approach path.

5. The method of claim 4, wherein the updated approach path is for placing a first object in a placement sequence for the packing plan.

6. The method of claim 4, wherein the updated approach path represents the motion plan associated with placement of the reference object that forms a perimeter edge or a corner for the packing plan.

7. The method of claim 4, wherein adjusting the existing packing plan includes adjusting the set of placement locations therein based on the candidate pack location.

8. The method of claim 7, wherein adjusting the existing packing plan includes adjusting motion plans therein for remaining objects within the set of objects based on a difference between the updated approach path and a previous approach path for the reference object according to the existing packing plan.

9. The method of claim 1, further comprising:
determining whether the existing packing plan includes a placement location for placing an object designated to be supported by a vertical wall of the container;
determining an updated placement location based on the candidate position for placing the object; and
wherein:
determining whether the candidate pack location is valid includes validating the updated placement location according to one or more rules configured to analyze support from a vertically-oriented structure.

10. The method of claim 1, wherein adjusting the existing packing plan includes dynamically re-deriving a new packing plan based on:
obtaining object models representative of the set of objects;
determining candidate positions for placing the set of objects;
overlaying the object models over the actual container model according to the candidate positions; and
validating the candidate positions based on one or more placement rules.

11. A robotic system comprising:
a communication device configured to communicate data with one or more circuits, the communication device for:
accessing an existing packing plan that represents a set of placement locations for placing a corresponding set of objects within a container; and
obtaining a real-time image that represents the container located at a task location and designated to receive the set of objects; and
at least one processor coupled to the communication device, the at least one processor for:
detecting an unexpected condition based on the real-time image, wherein the unexpected condition represents error conditions associated with the container or one or more support walls thereof;
dynamically generating an actual container model based on dividing the real-time image according to discretization units;
computing a packing unit based on the existing packing plan, wherein the packing unit represents one or more physical attributes of the set of objects;
deriving a candidate pack location for adjusting placements of the existing packing plan within the container;
overlaying the packing unit on the actual container model, wherein the packing unit is placed over the actual container model according to the candidate pack location;
determining a fit status based on the packing unit at the candidate pack location in comparison to the actual container model;
determining whether the candidate pack location is valid based on the fit status;
adjusting the existing packing plan according to the candidate pack location based on validation result; and
implementing the adjusted packing plan for placing the set of objects in the container using a robotic arm and an end-effector.

12. The robotic system of claim 11, wherein the at least one processor is for:
computing the packing unit based on determining an axis aligned bounding box (AABB) for the existing packing plan, wherein the AABB includes one or more rectangles that are (1) aligned according to a set of predetermined axes and (2) coincides with outer-most points of the objects represented the existing packing plan; and
determining the fit status based on determining whether the AABB at the candidate pack location overlaps or extends beyond at least one peripheral edge of the actual container model.

13. The robotic system of claim 11, wherein the at least one processor is for determining whether the candidate pack location is valid based on:
deriving an updated approach path representing a motion plan associated with placement of a reference object within the set of objects at an adjusted location that corresponds to shifting the packing plan to the candidate pack location; and
validating the candidate pack location based on successfully deriving the updated approach path.

14. The robotic system of claim 11, wherein the at least one processor is for:
determining whether the existing packing plan includes a placement location for placing an object designated to be supported by a vertical wall of the container;
wherein:
adjusting the existing packing plan includes determining an updated placement location for the object; and
determining whether the candidate pack location is valid includes validating the updated placement location according to one or more rules configured to analyze support from a vertically-oriented structure.

15. The robotic system of claim 11, wherein the at least one processor is for adjusting the existing packing plan by dynamically re-deriving a new packing plan based on:
obtaining object models representative of the set of objects;
determining candidate positions for placing the set of objects;
overlaying the object models over the actual container model according to the candidate positions; and
validating the candidate positions based on one or more placement rules.

16. A tangible, non-transitory computer-readable medium having processor instructions stored thereon that, when executed by one or more processors, cause the one or more processors to perform a method, the method comprising:
accessing an existing packing plan that represents a set of placement locations for placing a corresponding set of objects within a container;
obtaining a real-time image that represents the container located at a task location and designated to receive the set of objects;
detecting an unexpected condition based on the real-time image, wherein the unexpected condition represents error conditions associated with the container or one or more support walls thereof;
dynamically generating an actual container model based on dividing the real-time image according to discretization units;
computing a packing unit based on the existing packing plan, wherein the packing unit represents one or more physical attributes of the set of objects;
deriving a candidate pack location for adjusting placements of the existing packing plan within the container;
overlaying the packing unit on the actual container model, wherein the packing unit is placed over the actual container model according to the candidate pack location;

determining a fit status based on the packing unit at the candidate pack location in comparison to the actual container model;

determining whether the candidate pack location is valid based on the fit status;

adjusting the existing packing plan according to the candidate pack location based on validation result; and implementing the adjusted packing plan for placing the set of objects in the container using a robotic arm and an end-effector.

17. The tangible, non-transient computer-readable medium of claim 16, wherein:

computing the packing unit includes determining an axis aligned bounding box (AABB) for the existing packing plan, wherein the AABB includes one or more rectangles that are (1) aligned according to a set of predetermined axes and (2) coincides with outer-most points of the existing packing plan; and determining the fit status includes determining whether the AABB at the candidate pack location overlaps or extends beyond at least one peripheral edge of the actual container model.

18. The tangible, non-transient computer-readable medium of claim 16, determining whether the candidate pack location is valid includes:

deriving an updated approach path representing a motion plan associated with placement of a reference object within the set of objects at an adjusted location that corresponds to shifting the packing plan to the candidate pack location; and validating the candidate pack location based on successfully deriving the updated approach path.

19. The tangible, non-transient computer-readable medium of claim 16, wherein:

the method further comprises determining whether the existing packing plan includes a placement location for placing an object designated to be supported by a vertical wall of the container;

adjusting the existing packing plan includes determining an updated placement location for the object; and determining whether the candidate pack location is valid includes validating the updated placement location according to one or more rules configured to analyze support from a vertically-oriented structure.

20. The tangible, non-transient computer-readable medium of claim 16, wherein adjusting the existing packing plan includes dynamically re-deriving a new packing plan based on:

obtaining object models representative of the set of objects;

determining candidate positions for placing the set of objects;

overlaying the object models over the actual container model according to the candidate positions; and validating the candidate positions based on one or more placement rules.

\* \* \* \* \*